United States Patent
Watanabe et al.

(10) Patent No.: US 10,392,309 B2
(45) Date of Patent: Aug. 27, 2019

(54) ALUMINA POROUS BODY AND METHOD FOR MANUFACTURING SAME

(71) Applicants: Hirokazu Watanabe, Nagoya (JP); N. Nair Balagopal, Nagoya (JP)

(72) Inventors: Hirokazu Watanabe, Nagoya (JP); N. Nair Balagopal, Nagoya (JP)

(73) Assignee: NORITAKE CO., LIMITED, Nagoya (JP)

( * ) Notice: Subject to any disclaimer, the term of this patent is extended or adjusted under 35 U.S.C. 154(b) by 0 days.

(21) Appl. No.: 14/405,878

(22) PCT Filed: May 17, 2013

(86) PCT No.: PCT/JP2013/063858
§ 371 (c)(1),
(2) Date: Dec. 5, 2014

(87) PCT Pub. No.: WO2013/187182
PCT Pub. Date: Dec. 19, 2013

(65) Prior Publication Data
US 2015/0147561 A1 May 28, 2015

(30) Foreign Application Priority Data

Jun. 15, 2012 (JP) ................. 2012-136366

(51) Int. Cl.
*C04B 35/10* (2006.01)
*C04B 41/45* (2006.01)
(Continued)

(52) U.S. Cl.
CPC .......... *C04B 35/10* (2013.01); *B01D 39/2075* (2013.01); *C04B 35/505* (2013.01);
(Continued)

(58) Field of Classification Search
CPC .. C04B 35/10; C04B 35/1015; C04B 41/4582
See application file for complete search history.

(56) References Cited

U.S. PATENT DOCUMENTS

| | | | | | |
|---|---|---|---|---|---|
| 4,267,483 A | * | 5/1981 | Nakajima | ............... | H01T 13/38 313/141 |
| 4,757,045 A | * | 7/1988 | Turner | ................. | B01D 53/945 423/213.5 |

(Continued)

FOREIGN PATENT DOCUMENTS

| | | |
|---|---|---|
| JP | 62-252381 A | 11/1987 |
| JP | 1-0317178 A | 12/1989 |

(Continued)

OTHER PUBLICATIONS

The Kaolin & Ball Clay Association UK, "What is Kaolin?", 2007, p. 1-2; Accessed at http://www.kabca.org/what-is-kaolin.php.*

(Continued)

*Primary Examiner* — Mark Ruthkosky
*Assistant Examiner* — Julia L Rummel
(74) *Attorney, Agent, or Firm* — Oliff PLC

(57) ABSTRACT

A ceramic porous body has an alumina porous body made up by binding aggregate alumina particles to each other, the aggregate alumina particles being bound to each other by a compound including gadolinium silicate, lanthanum silicate or yttrium silicate synthesized from a silicate mineral and at least one rare-earth oxide selected from $Gd_2O_3$, $La_2O_3$, and $Y_2O_3$, and an inorganic porous film formed on the alumina porous body.

14 Claims, 19 Drawing Sheets

(51) Int. Cl.
*C04B 38/00* (2006.01)
*B01D 39/20* (2006.01)
*C04B 35/63* (2006.01)
*C04B 35/653* (2006.01)
*C04B 41/87* (2006.01)
*C04B 41/00* (2006.01)
*C04B 41/50* (2006.01)
*C04B 35/505* (2006.01)
*C04B 35/64* (2006.01)
*C04B 111/00* (2006.01)

(52) U.S. Cl.
CPC .......... *C04B 35/6316* (2013.01); *C04B 35/64* (2013.01); *C04B 35/653* (2013.01); *C04B 38/0038* (2013.01); *C04B 38/0074* (2013.01); *C04B 41/009* (2013.01); *C04B 41/0018* (2013.01); *C04B 41/4582* (2013.01); *C04B 41/5031* (2013.01); *C04B 41/87* (2013.01); *B01D 2239/1241* (2013.01); *C04B 2111/00793* (2013.01); *C04B 2235/3218* (2013.01); *C04B 2235/3224* (2013.01); *C04B 2235/3225* (2013.01); *C04B 2235/3227* (2013.01); *C04B 2235/349* (2013.01); *C04B 2235/3427* (2013.01); *C04B 2235/3463* (2013.01); *C04B 2235/85* (2013.01); *Y10T 428/249969* (2015.04)

(56) References Cited

U.S. PATENT DOCUMENTS

| | | | |
|---|---|---|---|
| 4,965,230 A | 10/1990 | Nakajima et al. | |
| 4,990,181 A * | 2/1991 | Pierotti | B01D 39/2034 419/36 |
| 5,085,720 A * | 2/1992 | Mikeska | C04B 35/6303 156/289 |
| 5,470,222 A * | 11/1995 | Holowczak | C04B 38/00 431/328 |
| 2003/0108458 A1 | 6/2003 | Ichikawa et al. | |
| 2006/0213165 A1 | 9/2006 | Isomura et al. | |
| 2007/0172632 A1 | 7/2007 | Ohno et al. | |
| 2008/0138569 A1 | 6/2008 | Collier et al. | |
| 2008/0216603 A1 * | 9/2008 | Thompson | C04B 35/12 75/301 |
| 2009/0029105 A1 * | 1/2009 | Masukawa | B01D 39/2086 428/116 |
| 2009/0081601 A1 * | 3/2009 | Haskin | F23D 14/52 431/350 |
| 2010/0126132 A1 * | 5/2010 | Merkel | B01D 46/2455 55/523 |
| 2010/0229813 A1 * | 9/2010 | Ogata | C04B 35/111 123/146.5 R |
| 2011/0036080 A1 * | 2/2011 | Beall | F01N 13/0093 60/299 |
| 2011/0045971 A1 | 2/2011 | Collier et al. | |
| 2012/0047860 A1 * | 3/2012 | Boger | C04B 41/009 55/523 |
| 2012/0301666 A1 | 11/2012 | Collier et al. | |

FOREIGN PATENT DOCUMENTS

| | | |
|---|---|---|
| JP | 2002-234779 A | 8/2002 |
| JP | 2005-060126 A | 3/2005 |
| JP | 2006-263498 A | 10/2006 |
| JP | 2007-268463 A | 10/2007 |
| JP | 2010-512302 A | 4/2010 |
| JP | 2010-208901 A | 9/2010 |
| JP | 2012-062232 A | 3/2012 |
| JP | 05-021605 B2 | 9/2012 |
| WO | 2006-035645 A1 | 4/2006 |

OTHER PUBLICATIONS

Teall, J.; "The Natural History of Cordierite and its Associates", Nature, 1899, vol. 59, p. 380-381.*

Demange, D.; Bejet, M.; Dufour, B.; "New Methods for Measuring the Thermal Emissivity of Semi-transparent and Opaque Materials", QIRT Archives, 2006, p. 1-6; http://www.qirt.org/archives/qirt2006/papers/087.pdf.*

Sarkisov et al.; "Structure Formation in Production of Yttrium-Silicate Materials by the Sol-Gel Method", Glass and Ceramics, 2007, vol. 64, p. 3-6.*

Sep. 25, 2014 International Preliminary Report on Patentability cited in Application No. PCT/JP2013/063858.

Koichiro Fukuda, "Syntheses and Oxide-Ion Conductivity of Highly c-Axis-Oriented Polycrystals of Apatite-Type Lanthanum Silicates," 56, (2014), pp. 43-48.

Jul. 17, 2015 Office Action issued in Korean Application No. 10-2014-7036117.

Jan. 28, 2016 Search Report issued in European Application No. 13803914.4.

Nov. 20, 2015 Office Action issued in Korean Application No. 10-2014-7036117.

Mar. 30, 2016 Office Action issued in Korean Application No. 10-2014-7036117.

* cited by examiner

FIG.3

| | MIXING AMOUNT (mol%) | | | MULLITE/YTTRIA MOLAR RATIO | NECK MAIN COMPONENT | AVERAGE RADIAL CRUSHING STRENGTH (MPa) | AVERAGE PORE DIAMETER (μm) | POROSITY (%) |
|---|---|---|---|---|---|---|---|---|
| | ALUMINA (Al2O3) | MULLITE (Al6Si2O13) | YTTRIA (Y2O3) | | | | | |
| COMPARATIVE EXAMPLE PRODUCT 1 | 100.00 | 2.82 | 0.00 | — | — | 7 | — | — |
| COMPARATIVE EXAMPLE PRODUCT 2 | 100.00 | 2.53 | 0.29 | 8.7 | Al6Si2O13 | 18 | 8.5 | 37 |
| EXAMPLE PRODUCT 1 | 100.00 | 2.39 | 0.45 | 5.3 | Y2Si2O7 Al6Si2O13 | 46 | 8.8 | 38 |
| EXAMPLE PRODUCT 2 | 100.00 | 1.99 | 0.85 | 2.3 | Y2Si2O7 | 72 | 9.3 | 41 |
| EXAMPLE PRODUCT 3 | 100.00 | 1.42 | 1.42 | 1.0 | Y2Si2O7 Al5Y3O12 | 51 | 9.3 | 41 |
| COMPARATIVE EXAMPLE PRODUCT 3 | 100.00 | 0.85 | 1.99 | 0.4 | Al5Y3O12 | 20 | 9.0 | 39 |
| COMPARATIVE EXAMPLE PRODUCT 4 | 100.00 | 0.28 | 2.56 | 0.1 | Al5Y3O12 | 4 | 8.3 | 37 |
| COMPARATIVE EXAMPLE PRODUCT 5 | 100.00 | 0.00 | 2.82 | — | — | 4 | — | — |

FIG.15

| | MIXING AMOUNT (mol%) | | | KAOLINITE/YTTRIA MOLAR RATIO | NECK MAIN COMPONENT | AVERAGE RADIAL CRUSHING STRENGTH (MPa) | AVERAGE PORE DIAMETER (μm) | POROSITY (%) |
|---|---|---|---|---|---|---|---|---|
| | ALUMINA (Al2O3) | KAOLINITE (Al2Si2O5(OH)4) | YTTRIA (Y2O3) | | | | | |
| COMPARATIVE EXAMPLE PRODUCT 6 | 100.00 | 4.40 | 0.00 | — | — | 4 | — | — |
| COMPARATIVE EXAMPLE PRODUCT 7 | 100.00 | 3.95 | 0.45 | 8.7 | Al6Si2O13 | 20 | 7.5 | 31 |
| COMPARATIVE EXAMPLE PRODUCT 8 | 100.00 | 3.83 | 0.57 | 6.7 | Al6Si2O13 | 21 | 7.6 | 31 |
| EXAMPLE PRODUCT 4 | 100.00 | 3.70 | 0.70 | 5.3 | Y2Si2O7 Al6Si2O13 | 36 | 7.2 | 32 |
| EXAMPLE PRODUCT 5 | 100.00 | 3.46 | 0.95 | 3.7 | Y2Si2O7 Al6Si2O13 | 57 | 7.8 | 34 |
| EXAMPLE PRODUCT 6 | 100.00 | 3.08 | 1.32 | 2.3 | Y2Si2O7 | 100 | 8.7 | 37 |
| EXAMPLE PRODUCT 7 | 100.00 | 2.20 | 2.20 | 1.0 | Y2Si2O7 Al5Y3O12 | 83 | 8.4 | 37 |
| EXAMPLE PRODUCT 8 | 100.00 | 1.32 | 3.08 | 0.4 | Y2Si2O7 Al5Y3O12 | 54 | 7.8 | 36 |
| COMPARATIVE EXAMPLE PRODUCT 9 | 100.00 | 0.44 | 3.96 | 0.1 | Al5Y3O12 | 17 | 6.5 | 25 |

ALUMINA POROUS BODY AND METHOD FOR MANUFACTURING SAME

TECHNICAL FIELD

The present invention relates to an alumina porous body fired at a comparatively low temperature and a method of manufacturing the same.

BACKGROUND ART

A ceramic filter made up of a ceramic porous body and a separation film filter with an inorganic porous film (alumina, silica, zeolite, etc.) formed on a surface of the ceramic porous body are used for separation and filtration of gas and liquid in petrochemical, food chemistry, and energy industries. The ceramic porous body as described above is desired to have sufficient mechanical strength as well as a largest possible pore diameter and highest possible porosity so as to allow passage of large amounts of gas and liquid and therefore must be fired by using ceramic raw material having a comparatively large particle diameter; however, if a particle diameter is large, a material with high refractoriness like, for example, alumina particles must be sintered at a comparatively high temperature, for example, equal to or greater than 1700 degrees C. for acquiring necessary strength. Thus, to take measures against the problem as described above, for example, Patent Document 1 proposes a method of adding a certain amount of an organic pore forming agent and Patent Documents 2, 3, etc. propose methods of using an appropriate amount of a sintering auxiliary agent (such as a glass component, $SiO_2$, MgO, and $ZrO_2$). Patent Document 4 proposes a method of mixing coarse-particle alumina (5 to 50 μm) and fine alumina (2 μm or less) and firing the mixture at 1600 degrees C. lower than 1700 degrees C. so as to maintain high strength while high porosity is maintained.

Conventionally, to manufacture a two-layer structure ceramic filter with an inorganic porous film of fine-particle alumina etc. formed on the ceramic porous body as described above, slurry containing particles having a diameter smaller than particles making up the ceramic porous body is adjusted and applied onto a surface of the once-fired ceramic porous body, and the ceramic porous body is then fired again to sinter the slurry and acquire a porous thin film. However, as lower costs, higher performance of film material, and thinner films are realized, it is desired that the manufacturing of the two-layer structure ceramic filter as described above includes, for example, a step of applying the slurry onto a green molded body of a ceramic porous body molded into a predetermined shape from a material acquired by kneading ceramic particles with a molding auxiliary agent added thereto and simultaneously firing the green molded body and the slurry. The green molded body is an unfired ceramic porous body molded into a predetermined shape from a material acquired by kneading ceramic particles with a molding auxiliary agent added thereto, for example.

However, when the slurry is applied onto the green molded body as described above and the green molded body and the slurry are simultaneously fired, since a firing temperature for sintering slurry typically made of fine-particle alumina into a porous thin film is equal to or less than 1450 degrees C. and is comparatively low, if the firing is performed at, for example, a firing temperature of about 1600 degrees C. for firing the alumina porous body as described in Patent Document 4, the porous thin film is excessively sintering, resulting in progression of densification, and can no longer be applied to a ceramic filter, which is a problem.

PRIOR ART DOCUMENTS

Patent Documents

Patent Document 1: Japanese Unexamined Patent Application Publication (Translation of PCT Application) No. 2010-512302
Patent Document 2: Japanese Examined Patent Application Publication No. 5-21605
Patent Document 3: Japanese Laid-Open Patent Publication No. 1-317178
Patent Document 4: Japanese Laid-Open Patent Publication No. 62-252381
Patent Document 5: Japanese Laid-Open Patent Publication No. 2007-268463

SUMMARY OF THE INVENTION

Problem to Be Solved by the Invention

To solve such a problem, for example, firing is typically performed with a glass component added as a sintering auxiliary agent for the purpose of reducing the firing temperature of the alumina porous body; however, while the glass component acting as the sintering auxiliary agent dissolves in main raw material ceramic during firing to facilitate sintering, the dissolving glass component fills in fine pores of a ceramic porous body, reduces permeability of the ceramic porous body, and eventually causes deterioration in filter performance, which is a problem. Moreover, at the time of manufacturing of a two-layer structure ceramic filter with an inorganic porous film of alumina etc. formed on the ceramic porous body, the glass component diffuses into the inorganic porous film during firing, fills in fine pores of the inorganic porous film, reduces permeability of the porous film, and eventually causes deterioration in filter performance, which is a problem.

Patent Document 5 proposes that a glass component used as a sintering auxiliary agent is eluted by alkali treatment from a ceramic porous body so as to solve the problem. However, the method as described in Patent Document 5 has a problem that since the alkali treatment causes not only the glass component but also main raw material ceramic to elute, the strength of the ceramic porous body inevitably deteriorates.

The present invention was conceived in view of the situations and it is therefore an object of the present invention to provide an alumina porous body having comparatively large strength even when fired at a comparatively low temperature, and having comparatively high porosity and a comparatively large pore diameter, and a method for manufacturing the same.

Means for Solving the Problem

As a result of various studies in view of the situations, the present inventors found that when a Si compound, for example, mullite or kaolinite, and at least one rare-earth oxide selected from $Gd_2O_3$, $La_2O_3$, and $Y_2O_3$ are added to aggregate alumina particles and firing is performed at a firing temperature equal to or less than 1450 degrees C., an alumina porous body can be acquired that has comparatively large strength even when the particle diameter of the alumina particles is comparatively large, i.e., an alumina porous body can be acquired that has comparatively large strength along with comparatively high porosity and a comparatively large pore diameter. It is considered that when the Si compound and the rare-earth oxide added are fired, a compound ($R_xSi_yO_z$ (R=rare-earth element)) is synthesized between the aggregate alumina particles and the compound binds the alumina particles to each other, resulting in good binding strength even if the particle diameter of the alumina particles is large. The present invention was conceived based on such knowledge.

To achieve the object, the present invention provides (a) an alumina porous body made up by binding aggregate alumina particles to each other, (b) the aggregate alumina particles being bound to each other by a compound ($R_xSi_yO_z$ (R: rare-earth element)) synthesized from an Si compound and at least one rare-earth oxide selected from $Gd_2O_3$, $La_2O_3$, and $Y_2O_3$.

Effects of the Invention

According to the alumina porous body of the present invention, the aggregate alumina particles are bound to each other by a compound ($R_xSi_yO_z$ (R: rare-earth element)) synthesized from an Si compound and at least one rare-earth oxide selected from $Gd_2O_3$, $La_2O_3$, and $Y_2O_3$. Therefore, for example, even when the alumina particles having a large particle diameter are sintered at a comparatively low temperature, since the alumina particles are bound to each other by the compound (($R_xSi_yO_z$ (R: rare-earth element)) and good binding strength is acquired, the alumina porous bodies can be acquired that have comparatively large strength along with comparatively high porosity and a comparatively large pore diameter even in the case of the firing at a comparatively low temperature.

Preferably, the alumina porous bodies are used for a two-layer structure ceramic porous body with an inorganic porous film formed on the alumina porous body. Therefore, since the alumina porous body is sintered at a comparatively low temperature, for example, if the slurry for forming the inorganic porous film is applied onto the green molded body of the alumina porous body molded into a predetermined shape from material acquired by kneading alumina particles with a molding auxiliary agent added thereto and the green molded body and the slurry are simultaneously fired, progression of densification due to sintering is suppressed in the inorganic porous film.

Preferably, mullite and $Y_2O_3$ are used as the Si compound and the rare-earth oxide, respectively, and are mixed at a molar ratio thereof within a range of 0.5 to 7.5, respectively. Therefore, even when the alumina particles having a large particle diameter are sintered at a comparatively low temperature, the strength of the alumina porous bodies can preferably be improved.

Preferably, kaolinite and $Y_2O_3$ are used as the Si compound and the rare-earth oxide, respectively, and are mixed at a molar ratio thereof within a range of 0.2 to 6.2, respectively. Therefore, even when the alumina particles having a large particle diameter are sintered at a comparatively low temperature, the strength of the alumina porous bodies can preferably be improved.

Preferably, a method of manufacturing the alumina porous body comprises: (a) a first mixing step of mixing an Si compound and at least one rare-earth oxide selected from $Gd_2O_3$, $La_2O_3$, and $Y_2O_3$ with aggregate alumina particles; (b) a molding step of molding material mixed at the first mixing step into a predetermined shape; and (c) a firing step of firing molded body molded at the molding step at a firing temperature at which the compound is synthesized and melted to bind the alumina particles to each other.

According to the method of manufacturing the alumina porous bodies, the Si compound and at least one rare-earth oxide selected from $Gd_2O_3$, $La_2O_3$, and $Y_2O_3$ are mixed with the aggregate alumina particles at the first mixing step; the material mixed at the first mixing step is molded into a predetermined shape at the molding step; and the molded body molded at the molding step is fired at a firing temperature at which the compound is synthesized and melted to bind the alumina particles to each other at the firing step; and as a result, the alumina porous bodies are manufactured that have comparatively large strength along with comparatively high porosity and a comparatively large pore diameter even in the case of the firing at a comparatively low temperature.

Preferably, in the method of manufacturing the alumina porous bodies, at the first mixing step, mullite and $Y_2O_3$ are used as the Si compound and the rare-earth oxide, respectively, and are mixed at a molar ratio thereof within a range of 0.5 to 7.5, respectively. Therefore, even when the alumina particles having a large particle diameter are sintered at a comparatively low temperature, the strength of the alumina porous bodies can preferably be improved.

Preferably, in the method of manufacturing the alumina porous bodies, at the first mixing step, kaolinite and $Y_2O_3$ are used as the Si compound and the rare-earth oxide, respectively, and are mixed at a molar ratio thereof within a range of 0.2 to 6.2, respectively. Therefore, even when the alumina particles having a large particle diameter are sintered at a comparatively low temperature, the strength of the alumina porous bodies can preferably be improved.

Preferably, a method of manufacturing the two-layer structure ceramic porous body with an inorganic porous film formed on an alumina porous body comprises: (a) a first mixing step of mixing an Si compound and at least one rare-earth oxide selected from $Gd_2O_3$, $La_2O_3$, and $Y_2O_3$ with aggregate alumina particles; (b) a molding step of molding material mixed at the first mixing step into a predetermined shape; (c) a second mixing step of mixing an organic binder and water with inorganic powder making up the inorganic porous film so as to prepare slurry; (d) a slurry coating step of allowing the slurry prepared at the second mixing step to adhere in a layer form to a surface of molded body molded at the molding process; and (e) a firing step of firing the molded body with the slurry adhered in a layer form at the slurry coating step at a firing temperature at which the compound is synthesized and melted to bind the alumina particles to each other.

According to the method of manufacturing the two-layer structure ceramic porous body with the inorganic porous film formed on the alumina porous body, the Si compound and at least one rare-earth oxide selected from $Gd_2O_3$, $La_2O_3$, and $Y_2O_3$ are mixed with the aggregate alumina particles at the first mixing step; the material mixed at the first mixing step is molded into a predetermined shape at the molding step; the organic binder and the water are mixed with the inorganic powder making up the inorganic porous film so as to adjust the slurry at the second mixing step; the slurry adjusted at the second mixing step is allowed to adhere in a layer form at the slurry coating step to the surface of the molded body molded at the molding step; the molded body with the slurry allowed to adhere thereto in a layer form at the slurry coating step is fired at a firing temperature at which the compound is synthesized and melted to bind the alumina particles to each other at the firing step; and as a result, the two-layer structure ceramic porous body is manufactured that has the inorganic porous film formed on the alumina porous body with progression of densification preferably suppressed.

Preferably, in the method of manufacturing the two-layer structure ceramic porous body with the inorganic porous film formed on the alumina porous body, at the first mixing step, mullite and $Y_2O_3$ are used as the Si compound and the rare-earth oxide, respectively, and are mixed at a molar ratio thereof within a range of 0.5 to 7.5, respectively. Therefore, even when the alumina particles having a large particle diameter are sintered at a comparatively low temperature, the strength of the alumina porous bodies can preferably be improved.

Preferably, in the method of manufacturing the two-layer structure ceramic porous body with the inorganic porous film formed on the alumina porous body, at the first mixing step, kaolinite and $Y_2O_3$ are used as the Si compound and the rare-earth oxide, respectively, and are mixed at a molar ratio thereof within a range of 0.2 to 6.2, respectively. Therefore, even when the alumina particles having a large particle diameter are sintered at a comparatively low temperature, the strength of the alumina porous bodies can preferably be improved.

BRIEF DESCRIPTION OF THE DRAWINGS

FIG. 3 is a diagram indicating measurement results of average radial crushing strength etc. of the alumina porous body manufactured by adding mullite and yttria to alumina particles in the manufacturing method of FIG. 2.

FIG. 15 is a diagram indicating measurement results of average radial crushing strength etc. of the alumina porous body manufactured by adding kaolinite and yttria to alumina particles in the manufacturing method of FIG. 2.

MODES FOR CARRYING OUT THE INVENTION

An example of the present invention will now be described in detail with reference to the drawings. In the following example, the figures are simplified or deformed as needed and portions are not necessarily precisely depicted in terms of dimension ratio, shape, etc.

First Example

Figure 1:
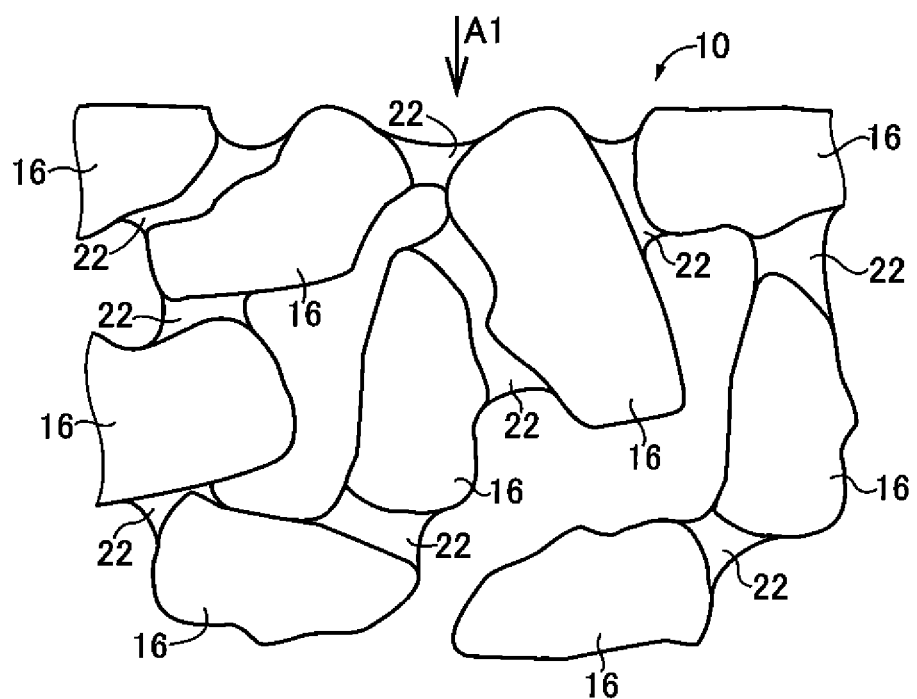
FIG. 1 is an enlarged schematic of a portion of an alumina porous body of the present invention.

FIG. 1 is a schematic of an alumina porous body 10 of an example of the present invention.

Figure 2:
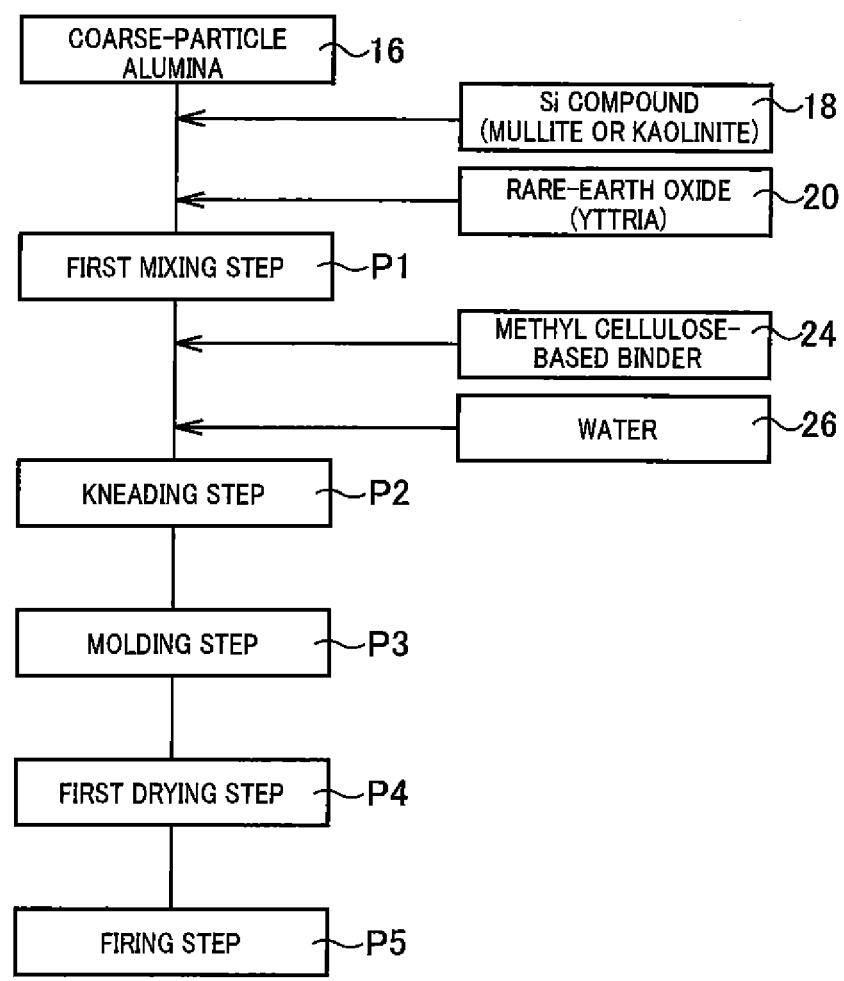
FIG. 2 is a flow chart for explaining a method of manufacturing the alumina porous body of FIG. 1.

As depicted in FIG. 1, the alumina porous body 10 is made up of a porous body having a plurality of fine pores molded into a predetermined shape, and aggregate alumina particles 16 are bound to each other by a compound ($R_XSi_YO_Z$ (R=rare-earth element)) 22 synthesized from an Si compound 18, for example, mullite ($Al_6Si_2O_{13}$) or kaolinite ($Al_2Si_2O_5(OH)_4$), depicted in FIG. 2 and at least one rare-earth oxide 20 depicted in FIG. 2 selected from $Gd_2O_3$, $La_2O_3$, and $Y_2O_3$. The compound 22 is $Y_XSi_YO_Z$ (yttrium silicate), $Gd_XSi_YO_Z$ (gadolinium silicate), and/or $La_XSi_YO_Z$ (lanthanum silicate). The alumina porous body 10 is acquired by using the alumina particles 16 having a comparatively large particle diameter of, for example, 15 μm to 50 μm (average particle diameter of 35 μm) so as to achieve comparatively high porosity (%) and a comparatively large average pore diameter (μm). The average particle diameter (μm) of the alumina particles 16 is a diameter measured by a laser diffraction scattering method using Master Sizer of Malvern Instruments.

As depicted in FIG. 1, for example, the alumina porous body 10 is configured as a ceramic filter allowing permeation of treated fluid such as gas or liquid supplied in an arrow A1 direction through the alumina porous body 10 to filtrate the treated fluid, i.e., filtration fluid.

The alumina porous body 10 has comparatively large strength even when fired at a comparatively low temperature since the aggregate alumina particles 16 are bound to each other by the compound 22 synthesized from the Si compound 18 and the rare-earth oxide 20.

A method of manufacturing the alumina porous body 10 will hereinafter be described with reference to FIG. 2. By manufacturing both the alumina porous body 10 with the alumina particles 16 bound to each other by the compound 22 synthesized from the Si compound 18 and the rare-earth oxide 20 with the manufacturing method of FIG. 2 and the alumina porous body 10 without binding the alumina particles 16 to each other by the compound 22, and by measuring and comparing the strength, i.e., average radial crushing strength KA (MPa), of these alumina porous bodies 10, it is demonstrated through the following experiments I and II that the average radial crushing strength KA (MPa) of the alumina porous body 10 is preferably made higher by causing the compound 22 to bind the alumina particles 16 to each other in the alumina porous body 10.

As depicted in FIG. 2, first, at a first mixing step P1, predetermined amounts of the Si compound 18, for example, mullite ($Al_6Si_2O_{13}$) of 1.5 μm in average particle diameter or kaolinite ($Al_2Si_2O_5(OH)_4$) of 0.6 μm in average particle diameter, and the rare-earth oxide 20, for example, yttria ($Y_2O_3$) of 0.5 μm in average particle diameter, are added as a sintering auxiliary agent to and mixed with coarse-particle alumina ($Al_2O_3$), i.e., the alumina particles 16, having a particle diameter within a range of 15 μm to 50 μm and an average particle diameter of 35 μm. Mixture powder mixed at the first mixing step P1 is prepared to contain 100 mol % coarse-particle alumina, 1.42 mol % to 2.39 mol % mullite or 1.32 mol % to 3.70 mol % kaolinite, and 0.45 mol % to 3.08 mol % yttria. The average particle diameters (μm) of the coarse-particle alumina, mullite, kaolinite, and yttria are diameters measured by a laser diffraction scattering method using Master Sizer of Malvern Instruments. The alumina particles 16 having a comparatively large diameter described in the particle diameter range are used so that the manufactured alumina porous body 10 has comparatively high porosity (%) and a comparatively large average pore diameter (μm).

At a kneading step P2, methyl cellulose-based binder 24 and water 26 are added to and kneaded with the mixture powder mixed at the first mixing step P1 as a molding auxiliary agent.

At a molding step P3, a green body kneaded in the kneading step P2 is used for extrusion molding into a predetermined shape, for example, a pipe shape (cylindrical shape), by a well-known extrusion molding machine.

At a first drying step P4, a molded body molded into a pipe shape at the molding step P3, i.e., a pipe-shaped green molded body is dried in a predetermined dryer at a temperature of, for example, about 80 degrees C. to reduce moisture content.

At a firing step P5, the pipe-shaped green molded body dried at the first drying step P4 is fired at a firing temperature of 1450 degrees C. under a firing condition of two hours in a predetermined firing furnace. As a result, the alumina porous body 10 is manufactured through the firing.

[Experiment I]

The experiment I will be described. At the manufacturing steps P1 to P5 of FIG. 2, the addition amount of mullite added to the coarse-particle alumina at the first mixing step P1 was changed as depicted in FIG. 3 within a range of 0.00 (mol %) to 2.82 (mol %), i.e., to 0.00 (mol %), 0.28 (mol %), 0.85 (mol %), 1.42 (mol %), 1.99 (mol %), 2.39 (mol %), 2.53 (mol %), and 2.82 (mol %), while the addition amount of yttria added to the coarse-particle alumina at the first mixing step P1 was changed within a range of 0.00 (mol %) to 2.82 (mol %), i.e., to 0.00 (mol %), 0.29 (mol %), 0.45 (mol %), 0.85 (mol %), 1.42 (mol %), 1.99 (mol %), 2.56 (mol %), and 2.82 (mol %), to manufacture eight types of samples of the alumina porous body 10, i.e., the alumina porous bodies 10 of example products 1 to 3 and comparative example products 1 to 5, so as to measure the average radial crushing strength KA (MPa), the average pore diameter (μm), and the porosity (%) of the alumina porous bodies 10 and examine main components of necks in the alumina porous bodies 10. The necks are bonds between the alumina particles 16 that are aggregate in the alumina porous bodies 10.

The measurement results will hereinafter be described with reference to FIGS. 3 to 7. The radial crushing strength K (MPa) of the alumina porous body 10 was measured in accordance with JIS Z 2507 "Sintered metal bearing—Determination of radial crushing strength" by placing the alumina porous body 10 molded into a cylindrical shape between plates forming a pair in a compression apparatus not depicted and applying a load F(N) to the alumina porous body 10 from the plates, and was calculated by following Equation (1). In Equation (1), F is a maximum load (N) when the alumina porous body 10 was destructed; L is a length (mm) of a hollow cylinder of the alumina porous body 10; D is an outer diameter (mm) of the hollow cylinder of the alumina porous body 10; and e is a wall thickness (mm) of the hollow cylinder of the alumina porous body 10. The average radial crushing strength KA (MPa) is an average value of the radial crushing strength K (MPa) of a plurality of the samples of the alumina porous bodies 10 manufactured with the same addition amounts of mullite and yttria added to coarse-particle alumina at the first mixing step P1.

[Equation 1]

$$\text{Radial crushing strength } K(\text{MPa}) = (F \times (D-e))/(L \times e^2) \quad (1)$$

The average pore diameter (μm) and the porosity (%) of the alumina porous body 10 were measured by a mercury press-in method using Auto Pore III of Micromeritics Instrument Corporation. Powder diffraction X-ray patterns of the alumina porous body 10 were measured by using a powder X-ray diffraction apparatus to determine the crystal structure of the alumina porous body 10, i.e., the main components of the necks.

Figure 4:
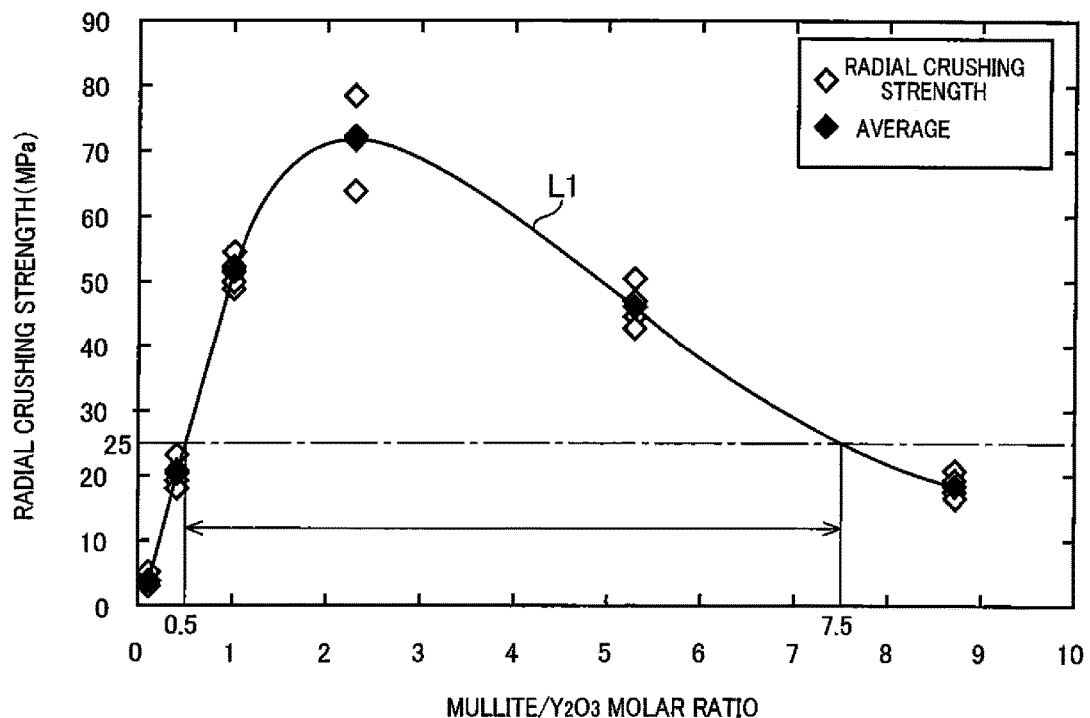
FIG. 4 is a diagram of respective average radial crushing strengths (MPa) of the alumina porous bodies of example products 1 to 3 and comparative example products 2 to 4 in FIG. 3.
Figure 7:
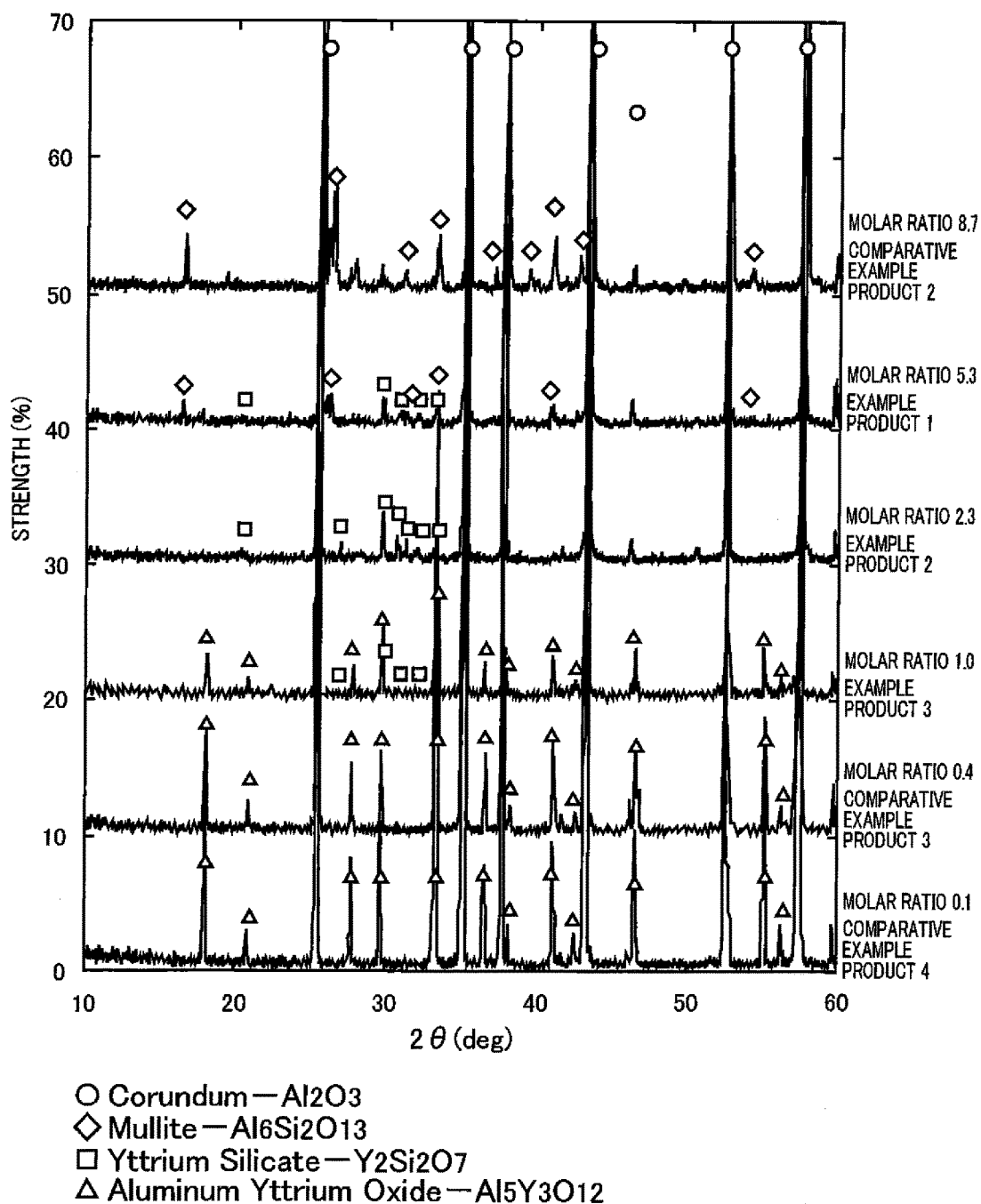
FIG. 7 is a diagram of respective powder diffraction X-ray patterns of the alumina porous bodies of example products 1 to 3 and comparative example products 2 to 4 in FIG. 3 measured by powder X-ray diffraction.

As indicated by the measurement results of FIGS. 3 and 7, the alumina porous bodies 10 of the example products 1 to 3 have the average radial crushing strength KA (MPa) higher than the alumina porous bodies 10 of the comparative example products 1 to 5, and the alumina porous bodies 10 of the example products 1 to 3 contain $Y_2Si_2O_7$ (yttrium silicate) in the main components of the necks binging the alumina particles 16 to each other. FIG. 4 is a diagram of the average radial crushing strength KA (MPa) indicated by the vertical axis and a molar ratio of mullite/$Y_2O_3$ (yttria) indicated by the horizontal axis and FIG. 4 depicts a curve L1 acquired by connecting values of the average radial crushing strength KA (MPa) of the alumina porous bodies 10 of the example products 1 to 3 and the comparative example products 2 to 4 described above. The curve L1 of FIG. 4 represents that when the mullite/yttria molar ratio is 0.5 to 7.5, the average radial crushing strength KA (MPa) is equal to or greater than 25 MPa. Although the required strength varies depending on a condition under which the alumina porous body 10 is used, the average radial crushing strength KA (MPa) of 25 MPa is generally considered as sufficient strength for the alumina porous body 10.

Figure 5:
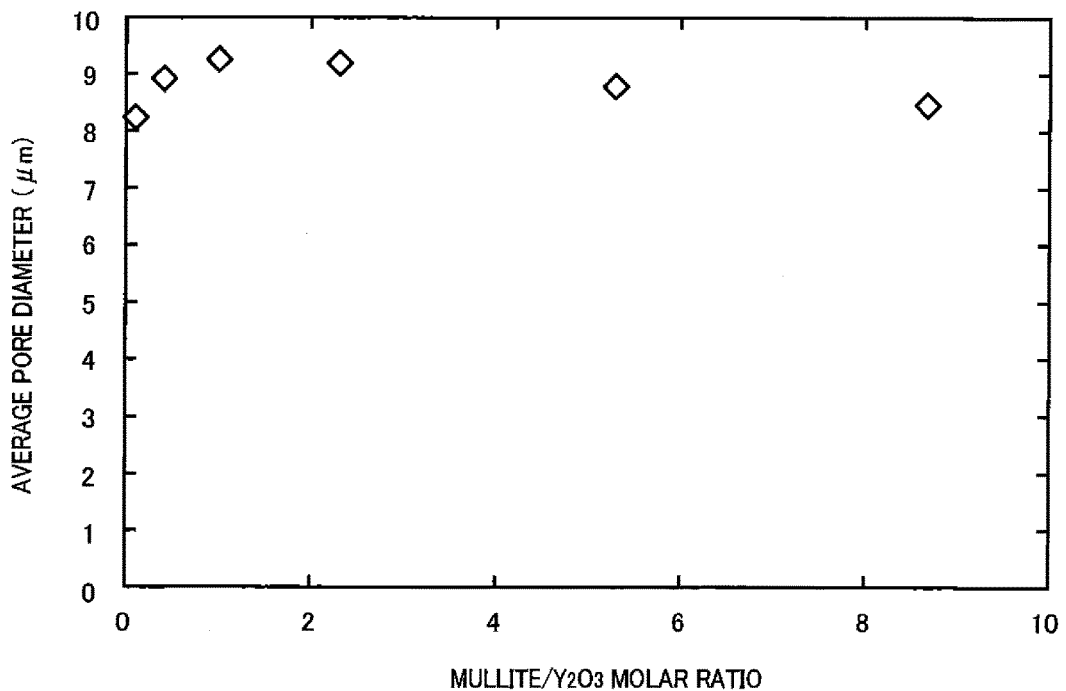
FIG. 5 is a diagram of respective average pore diameters (µm) of the alumina porous bodies of example products 1 to 3 and comparative example products 2 to 4 in FIG. 3.
Figure 6:
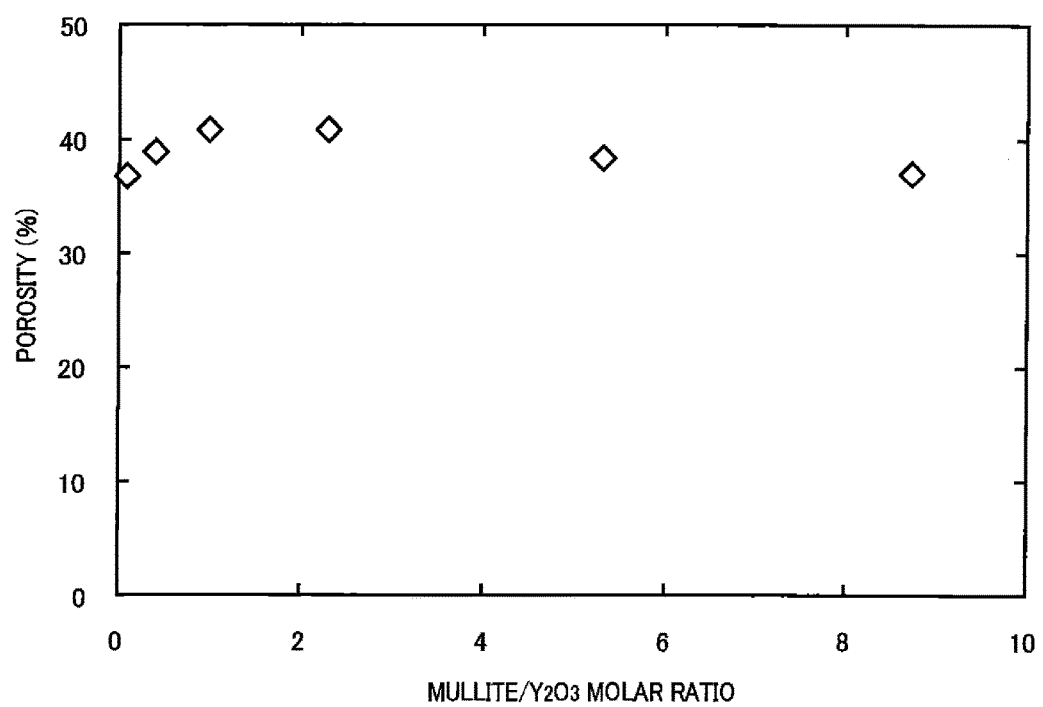
FIG. 6 is a diagram of respective porosities (%) of the alumina porous bodies of example products 1 to 3 and comparative example products 2 to 4 in FIG. 3.

As indicated by the measurement results of FIGS. 3 and 5, in the alumina porous bodies 10 of the example products 1 to 3 and the comparative example products 2 to 4, a size of the average pore diameter (μm) of the alumina porous bodies 10 is a comparatively large value equal to or greater than 7.0 μm, and no significant difference exists between the average pore diameter (μm) of the alumina porous bodies 10 of the example products 1 to 3 and the average pore diameter (μm) of the alumina porous bodies 10 of the comparative example products 2 to 4. As indicated by the measurement results of FIGS. 3 and 6, in the alumina porous bodies 10 of the example products 1 to 3 and the comparative example products 2 to 4, a degree of the porosity (%) of the alumina porous bodies 10 is a comparatively high value equal to or greater than 30%, and no significant difference exists between the porosity (%) of the alumina porous bodies 10 of the example products 1 to 3 and the porosity (%) of the alumina porous bodies 10 of the comparative example products 2 to 4.

Figure 8:
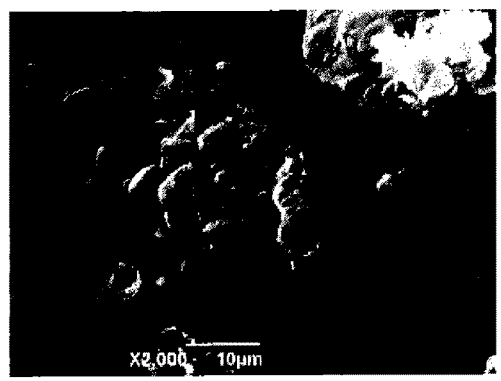
FIG. 8 is a diagram of a SEM image of a portion of a fracture surface of the alumina porous body of an example product 1 in FIG. 3 taken by a scanning electron microscope.
Figure 9:
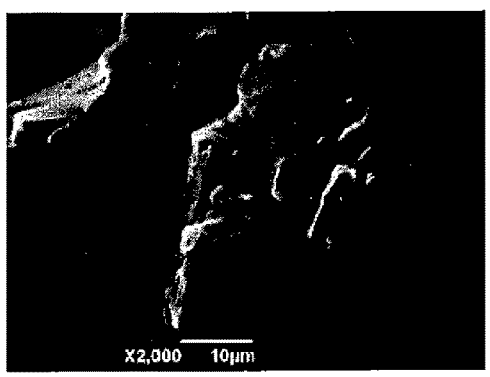
FIG. 9 is a diagram of a SEM image of a portion of a fracture surface of the alumina porous body of an example product 2 in FIG. 3 taken by a scanning electron microscope.
Figure 10:
FIG. 10 is a diagram of a SEM image of a portion of a fracture surface of the alumina porous body of an example product 3 in FIG. 3 taken by a scanning electron microscope.
Figure 11:
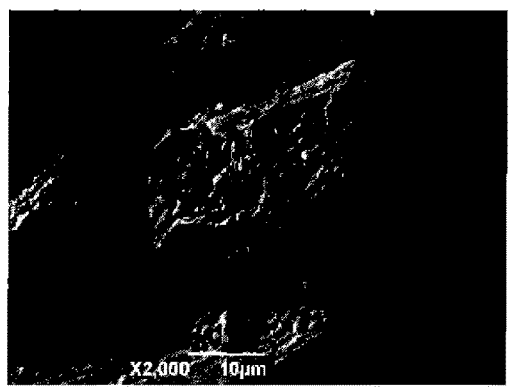
FIG. 11 is a diagram of a SEM image of a portion of a fracture surface of the alumina porous body of a comparative example product 3 in FIG. 3 taken by a scanning electron microscope.
Figure 12:
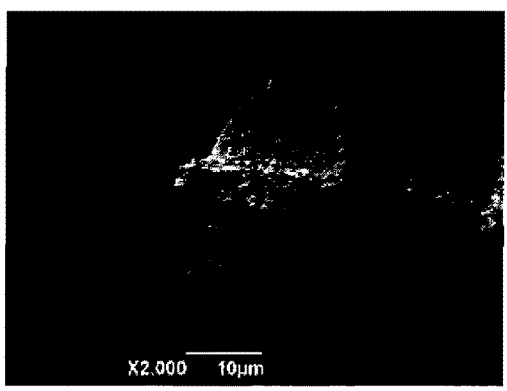
FIG. 12 is a diagram of a SEM image of a portion of a fracture surface of the alumina porous body of a comparative example product 4 in FIG. 3 taken by a scanning electron microscope.
Figure 13:
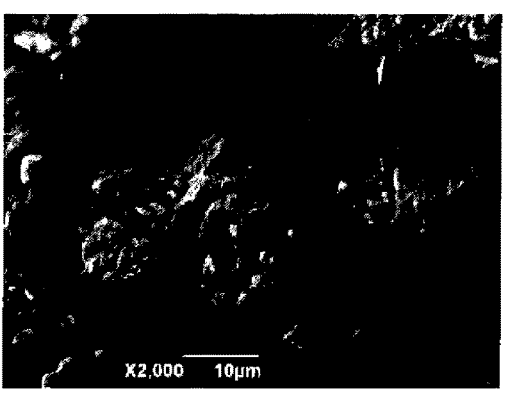
FIG. 13 is a diagram of a SEM image of a portion of a fracture surface of the alumina porous body of a comparative example product 1 in FIG. 3 taken by a scanning electron microscope.
Figure 14:
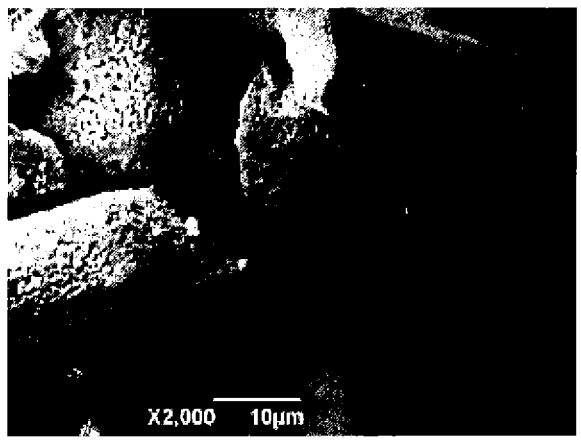
FIG. 14 is a diagram of a SEM image of a portion of a fracture surface of the alumina porous body of a comparative example product 5 in FIG. 3 taken by a scanning electron microscope.

FIGS. 8 to 14 are diagrams of SEM (scanning electron microscope) images of portions of fracture surfaces of the alumina porous bodies 10 taken by a scanning electron microscope. FIG. 8 depicts the SEM image of the alumina porous body 10 of the example product 1 having the mullite/yttria molar ratio of 5.3; FIG. 9 depicts the SEM image of the alumina porous body 10 of the example product 2 having the mullite/yttria molar ratio of 2.3; FIG. 10 depicts the SEM image of the alumina porous body 10 of the example product 3 having the mullite/yttria molar ratio of 1.0; FIG. 11 depicts the SEM image of the alumina porous body 10 of the comparative example product 3 having the mullite/yttria molar ratio of 0.4; FIG. 12 depicts the SEM image of the alumina porous body 10 of the comparative example product 4 having the mullite/yttria molar ratio of 0.1; FIG. 13 depicts the SEM image of the alumina porous body 10 of the comparative example product 1; and FIG. 14 depicts the SEM image of the alumina porous body 10 of the comparative example product 5. According to these images, the necks binding the alumina particles 16 to each other are grown in the alumina porous bodies 10 of the example products 1 to 3.

From the above, it is considered that, among the alumina porous bodies 10 of the example products 1 to 3 and the comparative example products 1 to 5 of FIG. 3, since the alumina particles 16 are bound to each other by $Y_2Si_2O_7$, which is the compound 22 synthesized from predetermined amounts of mullite and yttria added to the alumina particles 16, and good binding strength is acquired, the average radial crushing strength KA (MPa) becomes higher in the alumina porous bodies 10 of the example products 1 to 3 as compared to the alumina porous bodies 10 of the comparative example products 1 to 5 having the alumina particles 16 not bound to each other by $Y_2Si_2O_7$ synthesized from mullite and yttria in the alumina porous bodies 10. It is considered that the average radial crushing strength KA (MPa) of the alumina porous bodies 10 can preferably be set to a comparatively high value by setting the molar ratio of mullite and yttria added to the alumina particles 16 within a range of 0.5 to 7.5 in the alumina porous bodies 10 of the example products 1 to 3 and the comparative example products 2 to 4 of FIG. 3.

[Experiment II]

The experiment II will be described. At the manufacturing steps P1 to P5 of FIG. 2, the addition amount of kaolinite added to alumina at the first mixing step P1 was changed as depicted in FIG. 15, within a range of 0.44 (mol %) to 4.40 (mol %), i.e., to 0.44 (mol %), 1.32 (mol %), 2.20 (mol %), 3.08 (mol %), 3.46 (mol %), 3.70 (mol %), 3.83 (mol %), 3.95 (mol %), and 4.40 (mol %), while the addition amount of yttria added to alumina at the first mixing step P1 was changed within a range of 0.00 (mol %) to 3.96 (mol %), i.e., to 0.00 (mol %), 0.45 (mol %), 0.57 (mol %), 0.70 (mol %), 0.95 (mol %), 1.32 (mol %), 2.20 (mol %), 3.08 (mol %), and 3.96 (mol %), to manufacture nine types of samples of the alumina porous bodies 10, i.e., the alumina porous bodies 10 of example products 4 to 8 and comparative example products 6 to 9, so as to measure the average radial crushing strength KA (MPa), the average pore diameter (μm), and the porosity (%) of the alumina porous bodies 10 and examine main components of the necks in the alumina porous bodies 10.

The measurement results will hereinafter be described with reference to FIGS. 15 to 19. The radial crushing strength K (MPa) of the alumina porous body 10 was measured in accordance with JIS Z 2507 "Sintered metal bearing—Determination of radial crushing strength" as described above. The average pore diameter (μm) and the porosity (%) of the alumina porous body 10 were measured by using Auto Pore III of Micromeritics Instrument Corporation as described above. The main components of the necks binding the alumina particles 16 to each other in the alumina porous body 10 were determined by powder X-ray diffraction as described above.

Figure 16:
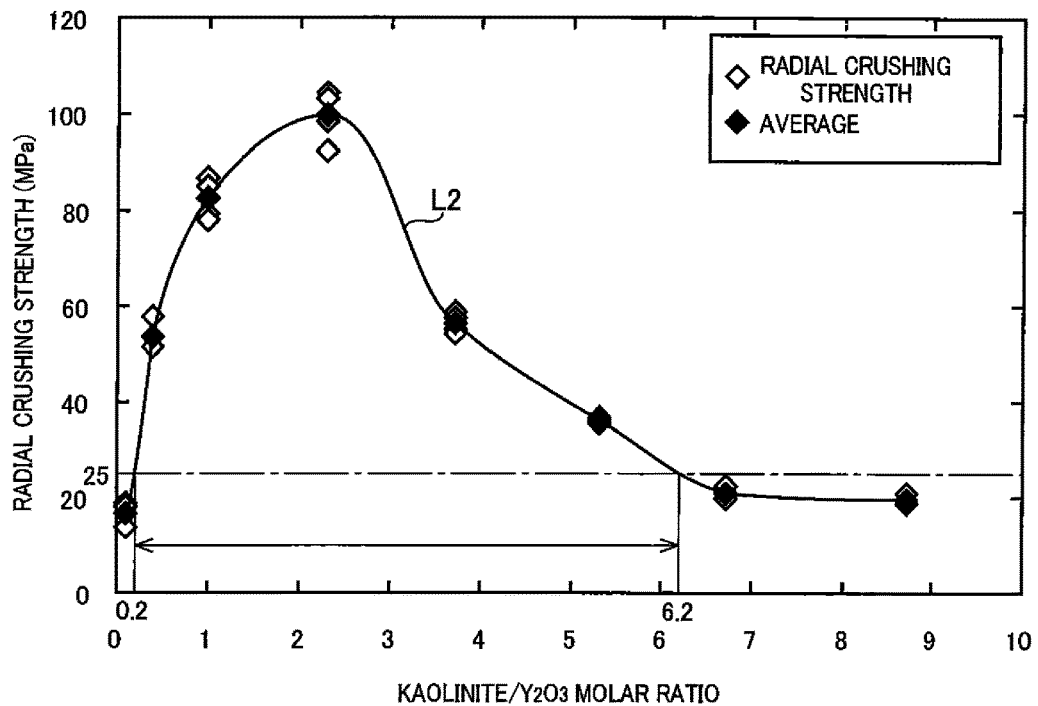
FIG. 16 is a diagram of respective average radial crushing strengths (MPa) of the alumina porous bodies of example products 4 to 8 and comparative example products 7 to 9 in FIG. 15.
Figure 19:
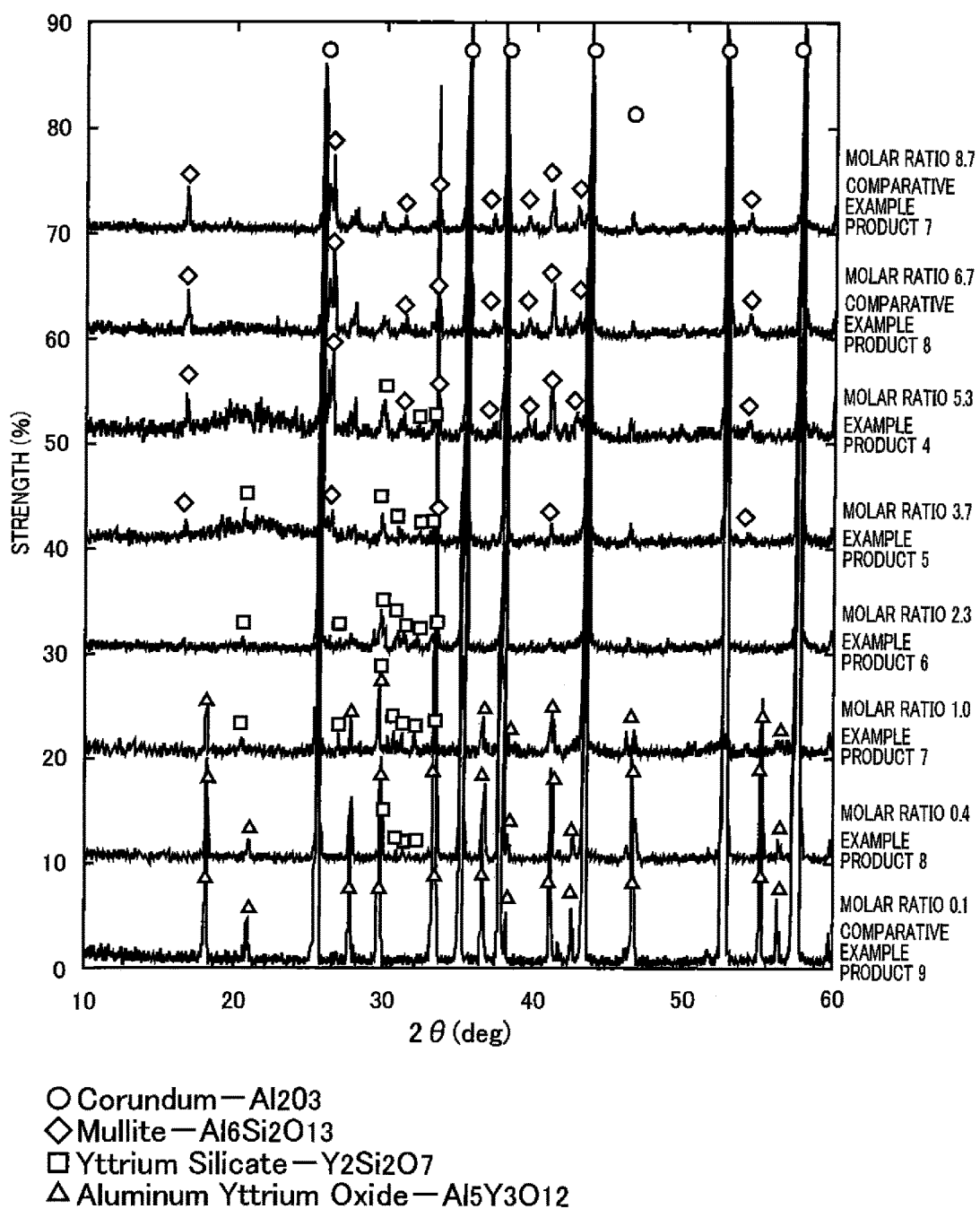
FIG. 19 is a diagram of respective powder diffraction X-ray patterns of the alumina porous bodies of example products 4 to 8 and comparative example products 7 to 9 in FIG. 15 measured by powder X-ray diffraction.

As indicated by the measurement results of FIGS. 15 and 19, the alumina porous bodies 10 of the example products 4 to 8 have the average radial crushing strength KA (MPa) higher than the alumina porous bodies 10 of the comparative example products 6 to 9, and the alumina porous bodies 10 of the example products 4 to 8 contain $Y_2Si_2O_7$ (yttrium silicate) in the main components of the necks binging the alumina particles 16 to each other. FIG. 16 is a diagram of the radial crushing strength K (MPa) indicated by the vertical axis and a molar ratio of kaolinite/$Y_2O_3$ (yttria) indicated by the horizontal axis and FIG. 16 depicts a curve L2 acquired by connecting values of the average radial crushing strength KA (MPa) of the alumina porous bodies 10 of the example products 4 to 8 and the comparative example products 7 to 9 described above. The curve L2 of FIG. 16 represents that when the kaolinite/yttria molar ratio is 0.2 to 6.2, the average radial crushing strength KA (MPa) is equal to or greater than 25 MPa.

Figure 17:
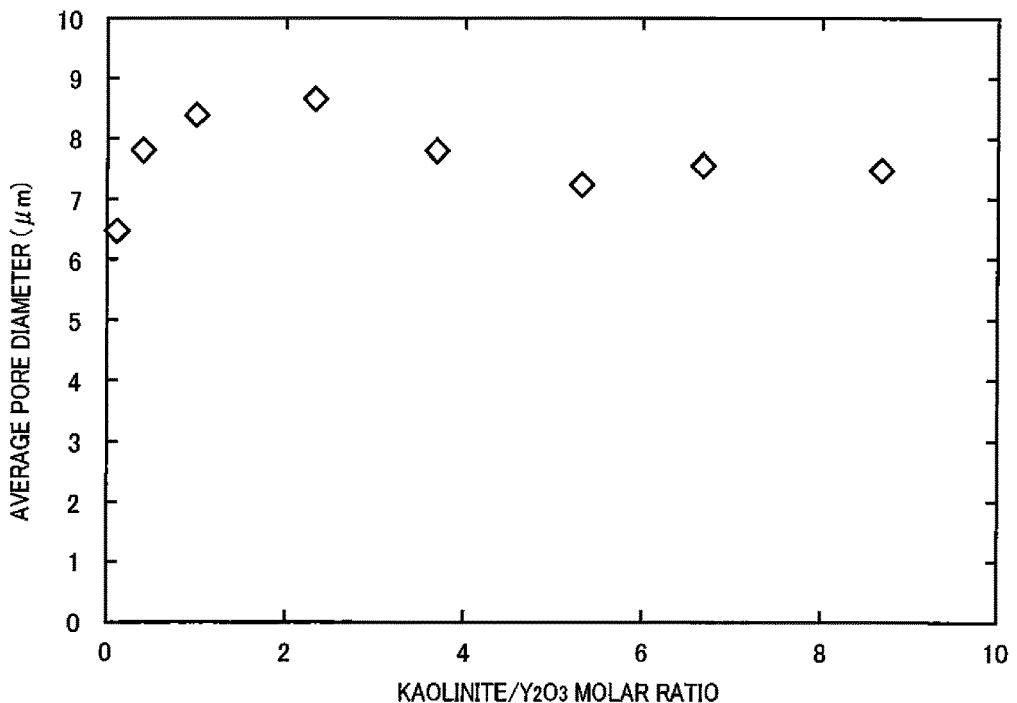
FIG. 17 is a diagram of respective average pore diameters (µm) of the alumina porous bodies of example products 4 to 8 and comparative example products 7 to 9 in FIG. 15.
Figure 18:
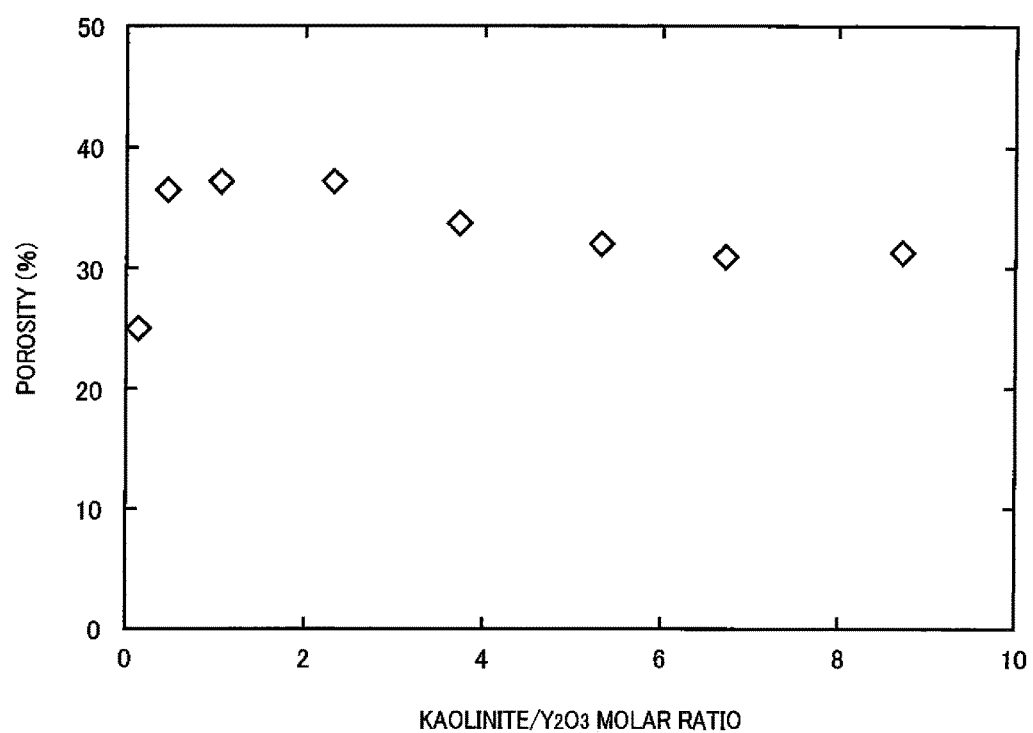
FIG. 18 is a diagram of respective porosities (%) of the alumina porous bodies of example products 4 to 8 and comparative example products 7 to 9 in FIG. 15.

As indicated by the measurement results of FIGS. 15 and 17, in the alumina porous bodies 10 of the example products 4 to 8 and the comparative example products 7 to 9, a size of the average pore diameter (μm) of the alumina porous bodies 10 is a comparatively large value equal to or greater than 7.0 μm except the alumina porous body 10 of the comparative example 9 having the average pore diameter (μm) equal to or less than 7.0 μm, and no significant difference exists between the average pore diameter (μm) of the alumina porous bodies 10 of the example products 4 to 8 and the average pore diameter (μm) of the alumina porous bodies 10 of the comparative example products 7, 8. As indicated by the measurement results of FIGS. 15 and 18, in the alumina porous bodies 10 of the example products 4 to 8 and the comparative example products 7 to 9, a degree of the porosity (%) of the alumina porous bodies 10 is a comparatively high value equal to or greater than 30% except the alumina porous body 10 of the comparative example 9 having the porosity (%) equal to or less than 30%, and no significant difference exists between the porosity (%) of the alumina porous bodies 10 of the example products 4 to 8 and the porosity (%) of the alumina porous bodies 10 of the comparative example products 7, 8.

Figure 20:
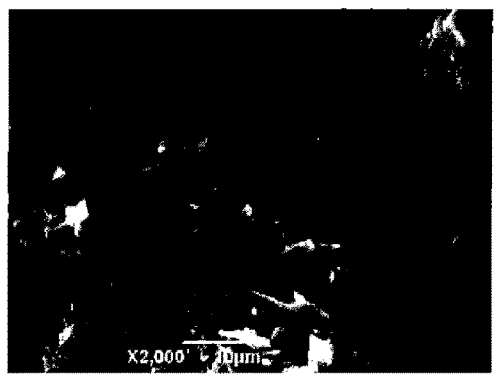
FIG. 20 is a diagram of a SEM image of a portion of a fracture surface of the alumina porous body of a comparative example product 7 in FIG. 15 taken by a scanning electron microscope.
Figure 21:
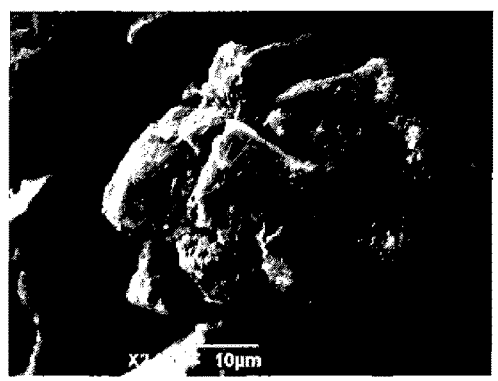
FIG. 21 is a diagram of a SEM image of a portion of a fracture surface of the alumina porous body of a comparative example product 8 in FIG. 15 taken by a scanning electron microscope.
Figure 22:
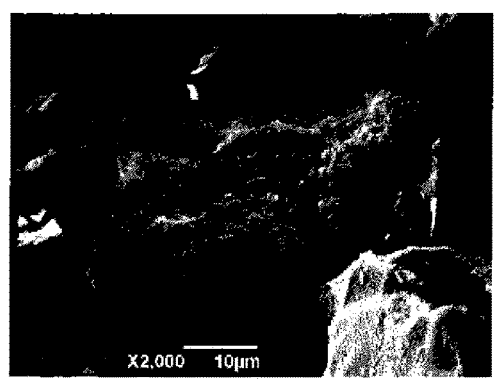
FIG. 22 is a diagram of a SEM image of a portion of a fracture surface of the alumina porous body of an example product 4 in FIG. 15 taken by a scanning electron microscope.
Figure 23:
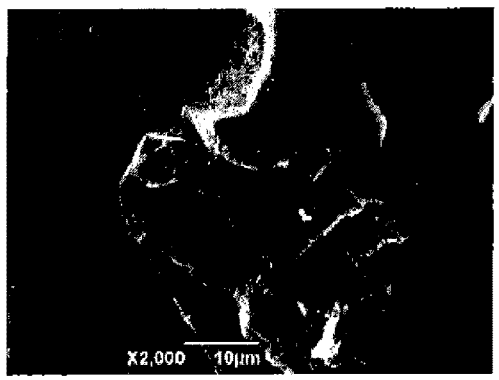
FIG. 23 is a diagram of a SEM image of a portion of a fracture surface of the alumina porous body of an example product 5 in FIG. 15 taken by a scanning electron microscope.
Figure 24:
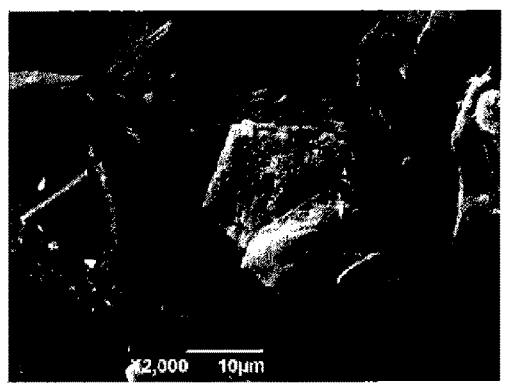
FIG. 24 is a diagram of a SEM image of a portion of a fracture surface of the alumina porous body of an example product 6 in FIG. 15 taken by a scanning electron microscope.
Figure 25:
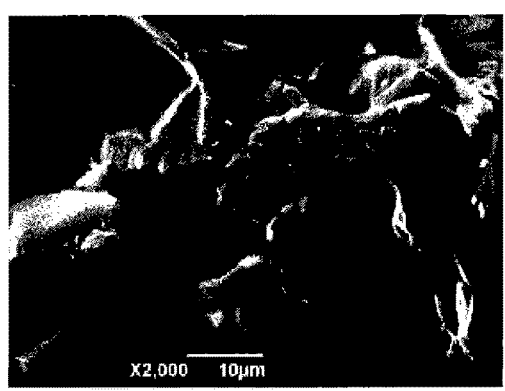
FIG. 25 is a diagram of a SEM image of a portion of a fracture surface of the alumina porous body of an example product 7 in FIG. 15 taken by a scanning electron microscope.
Figure 26:
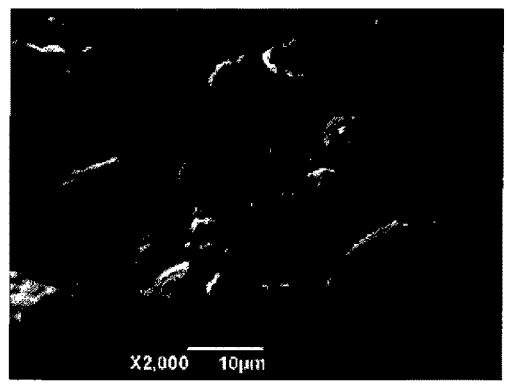
FIG. 26 is a diagram of a SEM image of a portion of a fracture surface of the alumina porous body of an example product 8 in FIG. 15 taken by a scanning electron microscope.
Figure 27:
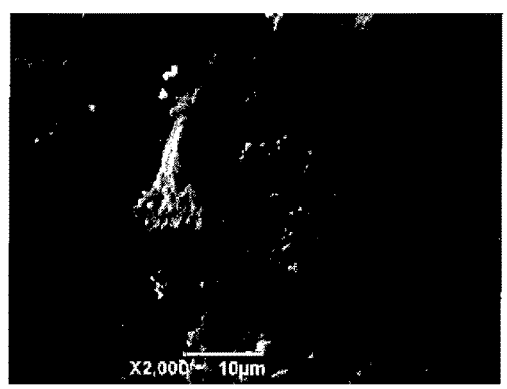
FIG. 27 is a diagram of a SEM image of a portion of a fracture surface of the alumina porous body of a comparative example product 9 in FIG. 15 taken by a scanning electron microscope.
Figure 28:
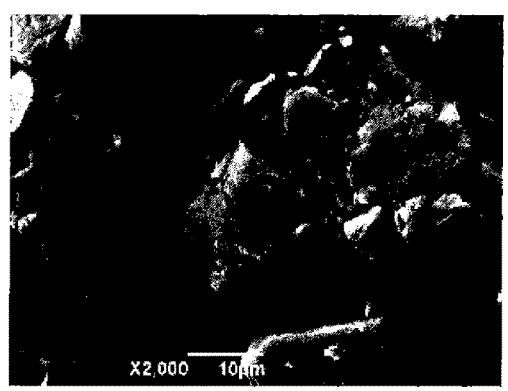
FIG. 28 is a diagram of a SEM image of a portion of a fracture surface of the alumina porous body of a comparative example product 6 in FIG. 15 taken by a scanning electron microscope.

FIGS. 20 to 28 are diagrams of SEM images of portions of fracture surfaces of the alumina porous bodies 10 taken by a scanning electron microscope. FIG. 20 depicts the SEM image of the alumina porous body 10 of the comparative example product 7 having the kaolinite/yttria molar ratio of 8.7; FIG. 21 depicts the SEM image of the alumina porous body 10 of the comparative example product 8 having the kaolinite/yttria molar ratio of 6.7; FIG. 22 depicts the SEM image of the alumina porous body 10 of the example product 4 having the kaolinite/yttria molar ratio of 5.3; FIG. 23 depicts the SEM image of the alumina porous body 10 of the example product 5 having the kaolinite/yttria molar ratio of 3.7; FIG. 24 depicts the SEM image of the alumina porous body 10 of the example product 6 having the kaolinite/yttria molar ratio of 2.3; FIG. 25 depicts the SEM image of the alumina porous body 10 of the example product 7 having the kaolinite/yttria molar ratio of 1.0; FIG. 26 depicts the SEM image of the alumina porous body 10 of the example product 8 having the kaolinite/yttria molar ratio of 0.4; FIG. 27 depicts the SEM image of the alumina porous body 10 of the comparative example product 9 having the kaolinite/yttria molar ratio of 0.1; and FIG. 28 depicts the SEM image of the alumina porous body 10 of the comparative example product 6. According to these images, the necks binding the alumina particles 16 to each other are grown in the alumina porous bodies 10 of the example products 4 to 8.

From the above, it is considered that, among the alumina porous bodies 10 of the example products 4 to 8 and the comparative example products 6 to 9 of FIG. 15, since the alumina particles 16 are bound to each other by $Y_2Si_2O_7$, which is the compound 22 synthesized from predetermined amounts of kaolinite and yttria added to the alumina particles 16, and good binding strength is acquired, the average radial crushing strength KA (MPa) becomes higher in the alumina porous bodies 10 of the example products 4 to 8 as compared to the alumina porous bodies 10 of the comparative example products 6 to 9 having the alumina particles 16 not bound to each other by $Y_2Si_2O_7$ synthesized from kaolinite and yttria in the alumina porous bodies 10. It is considered that the average radial crushing strength KA of the alumina porous bodies 10 can preferably be set to a comparatively high value by setting the molar ratio of kaolinite and yttria acting as a sintering auxiliary agent added to the alumina particles 16 within a range of 0.2 to 6.2 in the alumina porous bodies 10 of the example products 4 to 8 and the comparative example products 7 to 9 of FIG. 15.

As described above, according to the alumina porous bodies 10 of the example products 1 to 8, the aggregate alumina particles 16 are bound to each other by $Y_2Si_2O_7$ (yttrium silicate), which is the compound 22 synthesized from the Si compound 18, i.e., mullite or kaolinite, and the rare-earth oxide 20, i.e., yttria ($Y_2O_3$). Therefore, for example, even when the alumina particles 16 having a comparatively large particle diameter, for example, a particle diameter within a range of 15 μm to 50 μm, are sintered at a firing temperature set to a comparatively low temperature of 1450 degrees C., since the alumina particles 16 are bound to each other by $Y_2Si_2O_7$ and good binding strength is acquired, the alumina porous bodies 10 can be acquired that have comparatively large average radial crushing strength KA (MPa) along with comparatively high porosity (%) and a comparatively large average pore diameter (μm) even in the case of the firing at a comparatively low temperature.

According to the alumina porous bodies 10 of the example products 1 to 3, mullite and $Y_2O_3$ are used as the Si compound 18 and the rare-earth oxide 20, respectively, and are mixed at a molar ratio thereof within a range of 0.5 to 7.5. Therefore, even when the alumina particles 16 having a comparatively large particle diameter, for example, a particle diameter within a range of 15 μm to 50 μm, are sintered at a firing temperature set to a comparatively low temperature of 1450 degrees C., the average radial crushing strength KA of the alumina porous bodies 10 can be improved to 25 MPa or more.

According to the alumina porous bodies 10 of the example products 4 to 8, kaolinite and $Y_2O_3$ are used as the Si compound 18 and the rare-earth oxide 20, respectively, and are mixed at a molar ratio thereof within a range of 0.2 to 6.2. Therefore, even when the alumina particles 16 having a comparatively large particle diameter, for example, a particle diameter within a range of 15 μm to 50 μm, are sintered at a firing temperature set to a comparatively low temperature of 1450 degrees C., the average radial crushing strength KA of the alumina porous bodies 10 can be improved to 25 MPa or more.

According to the method of manufacturing the alumina porous bodies 10 of the example products 1 to 8, the Si compound 18, i.e., mullite or kaolinite, and the rare-earth oxide 20, i.e., yttria, are mixed with the aggregate alumina particles 16 at the first mixing step P1; the material mixed at the first mixing step P1 is molded into a predetermined shape at the molding step P3; and the pipe-shaped green molded body molded at the molding step P3 is fired at a firing temperature, for example, 1450 degrees C., at which the compound 22 is synthesized and melted to bind the alumina particles 16 to each other at the firing step P5; and as a result, the alumina porous bodies 10 are manufactured that have comparatively large average radial crushing strength KA (MPa) along with comparatively high porosity (%) and a comparatively large average pore diameter (μm) even in the case of the firing at a comparatively low temperature of 1450 degrees C.

According to the method of manufacturing the alumina porous bodies 10 of the example products 1 to 3, at the first mixing step P1, mullite and $Y_2O_3$ are used as the Si compound 18 and the rare-earth oxide 20, respectively, and are mixed at the molar ratio thereof within a range of 0.5 to 7.5. Therefore, even when the alumina particles 16 having a comparatively large particle diameter, for example, a particle diameter within a range of 15 μm to 50 μm, are sintered at a firing temperature set to a comparatively low temperature of 1450 degrees C., the average radial crushing strength KA of the alumina porous bodies 10 can be improved to 25 MPa or more.

According to the method of manufacturing the alumina porous bodies 10 of the example products 4 to 8, at the first mixing step P1, kaolinite and $Y_2O_3$ are used as the Si compound 18 and the rare-earth oxide 20, respectively, and mixed at the molar ratio thereof within a range of 0.2 to 6.2. Therefore, even when the alumina particles 16 having a comparatively large particle diameter, for example, a particle diameter within a range of 15 μm to 50 μm, are sintered at a firing temperature set to a comparatively low temperature of 1450 degrees C., the average radial crushing strength KA of the alumina porous bodies 10 can be improved to 25 MPa or more.

Another preferred example of the present invention will then be described with reference to the drawings. In the following description, the portions mutually common to the examples are denoted by the same reference numerals and will not be described.

Second Example

Figure 29:
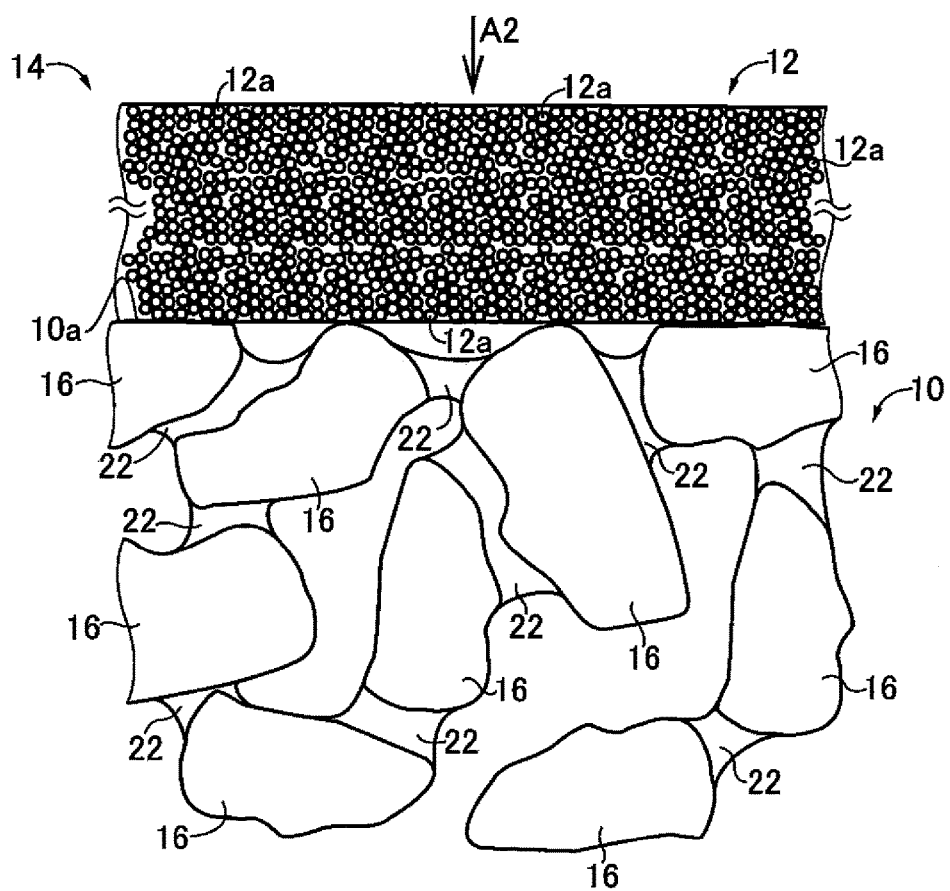
FIG. 29 is an enlarged schematic of a portion of a two-layer structure ceramic porous body with an inorganic porous film formed on the alumina porous body of FIG. 1.

FIG. 29 is a schematic of a two-layer structure ceramic porous body 14 with an inorganic porous film 12 formed on the alumina porous body 10 of the first Example.

The ceramic porous body 14 is provided with the inorganic porous film 12 formed on a surface 10a of the alumina porous body 10 and having a plurality of fine pores smaller than the fine pores of the alumina porous body 10. The inorganic porous film 12 is made of inorganic powder 12a of alumina, silica, or zeolite, for example, and the particle diameter of the inorganic powder 12a is sufficiently smaller than the alumina particles 16. The thickness of the inorganic porous film 12 is 10 to 300 μm and is about 80 μm, for example.

As depicted in FIG. 29, for example, the ceramic porous body 14 is configured as a ceramic filter allowing permeation of treated fluid such as gas or liquid supplied in an arrow A2 direction through the inorganic porous film 12 and the alumina porous body 10 to filtrate the treated fluid, i.e., filtration fluid.

In the case of the ceramic porous body 14, even if slurry is used that contains the inorganic powder 12a having a particle diameter smaller than the fine pores of the alumina porous body 10, the inorganic porous film 12 having a substantially uniform thickness is formed on the alumina porous body 10.

Figure 30:
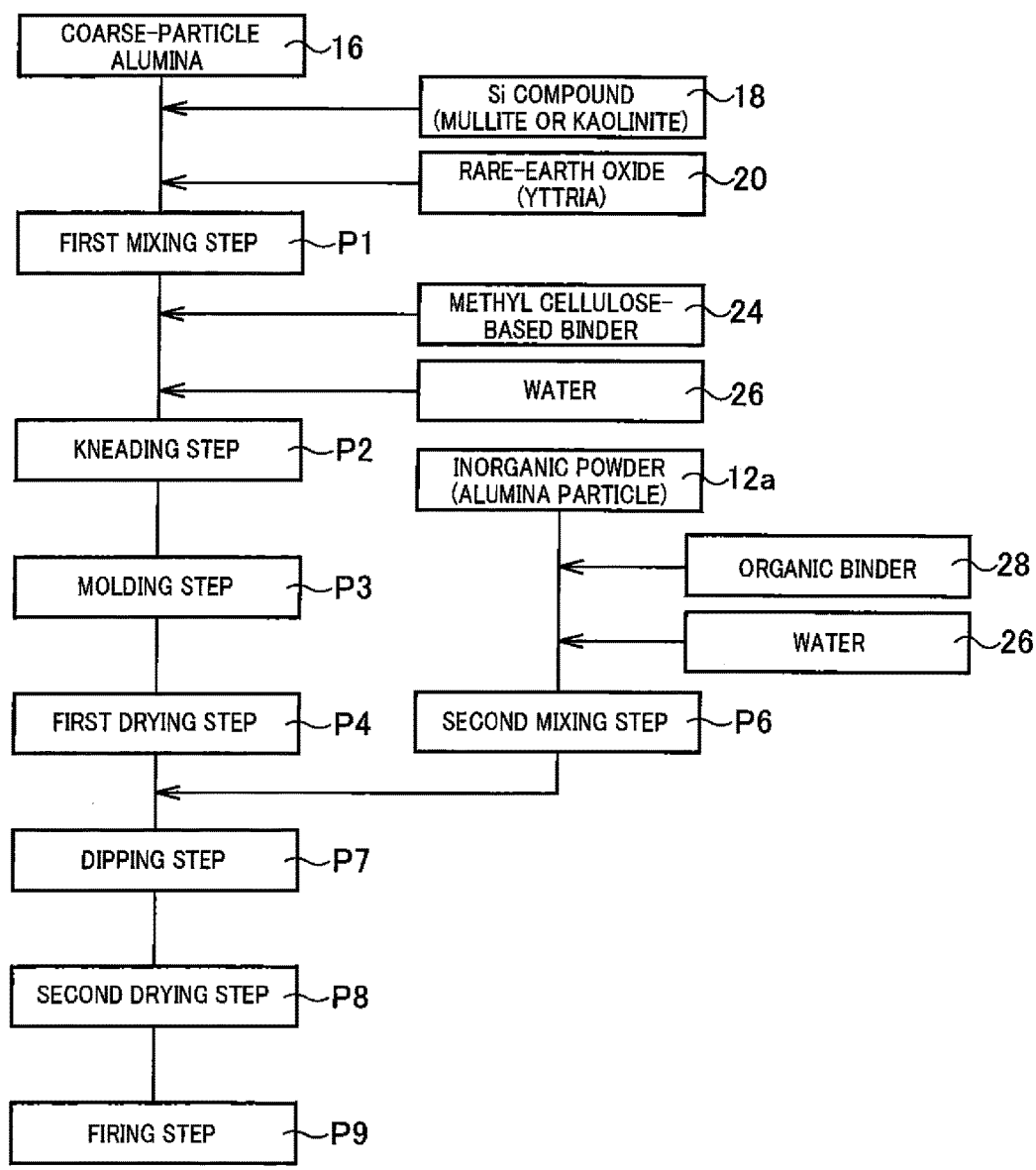
FIG. 30 is a flow chart for explaining a method of manufacturing the two-layer structure ceramic porous body of FIG. 29.

A method of manufacturing the two-layer structure ceramic porous body 14 with the inorganic porous film 12 formed on the alumina porous body 10 will hereinafter be described with reference to FIG. 30. By manufacturing both the two-layer structure ceramic porous body 14 with the inorganic porous film 12 formed on the alumina porous body 10 with the manufacturing method of FIG. 30 and the two-layer structure ceramic porous body 14 manufactured with a conventional method of applying slurry containing the inorganic powder 12a to the once fired alumina porous body 10 and firing the alumina porous body 10 again, and by comparing these two-layer structure ceramic porous bodies 14, it is demonstrated through the following experiment III that even in the case of using slurry containing the inorganic powder 12a having a particle diameter smaller than the fine pores of the alumina porous body 10, the inorganic porous film 12 of the two-layer structure ceramic porous body 14 manufactured with the manufacturing method of FIG. 30 is formed with a substantially uniform thickness.

The method of manufacturing the two-layer structure ceramic porous body 14 will hereinafter be described with reference to FIG. 30. The first mixing step P1 to the first drying step P4 of FIG. 2 are the same as the first mixing step P1 to the first drying step P4 of FIG. 30 and, therefore, a second mixing step P6 will first be described without describing the first mixing step P1 to the first drying step P4 of FIG. 30.

At the second mixing step P6, an organic binder 28 and the water 26 are mixed and stirred with the inorganic powder 12a making up the inorganic porous film 12, for example, the alumina particles 12a of 1.5 μm in average particle diameter, so as to adjust slurry. The average particle diameter (μm) of the alumina particles 12a is measured by using Master Sizer of Malvern Instruments as described above. The alumina particles 12a are sufficiently smaller than the fine pores of the alumina porous body 10 manufactured in FIG. 2.

At a dipping step (slurry coating step) P7, the pipe-shaped green molded body molded at the molding step P3 is dipped into the slurry adjusted at the second mixing step P6 and the slurry is allowed to adhere to a surface of the pipe-shaped green molded body in a layer form.

At a second drying step P8, the pipe-shaped green molded body with the slurry allowed to adhere to the surface at the dipping step P7 is dried in a predetermined dryer at a temperature of, for example, about 80 degrees C. to reduce moisture content.

At a firing step P9, the pipe-shaped green molded body dried at the second drying step P8 is fired at a firing temperature of 1450 degrees C. under a firing condition of two hours in a predetermined firing furnace. As a result, the two-layer structure ceramic porous body 14 with the inorganic porous film 12 formed on the alumina porous body 10 is manufactured through the firing.

[Experiment III]

Figure 31:
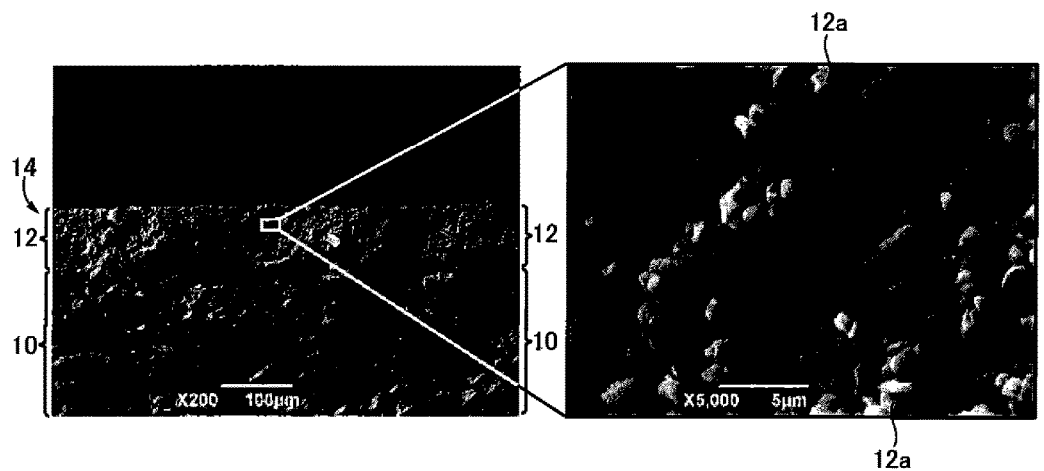
FIG. 31 is a diagram of a SEM image of a portion of a fracture surface of the two-layer structure ceramic porous body manufactured by the manufacturing method of FIG. 30 taken by a scanning electron microscope.

The experiment III will be described. At the manufacturing steps P1 to P9 of FIG. 30, the addition amount of mullite added to alumina at the first mixing step P1 was set to 1.99 mol %, while the addition amount of yttria added to alumina at the first mixing step P1 was set to 0.85 mol %, to manufacture the two-layer structure ceramic porous body 14 of the second example. After the alumina porous body 10 of the example product 2 acquired by firing the pipe-shaped green molded body at 1450 degrees C. for two hours was dipped into the slurry adjusted at the second mixing step P6 and dried, the alumina porous body 10 was fired again at 1450 degrees C. for two hours to manufacture the two-layer structure ceramic porous body 14 of a comparative example. The states of the inorganic porous films 12 of these two-layer structure ceramic porous bodies 14 were compared by using FIGS. 31 and 32. FIG. 31 depicts a SEM image of a portion of a fracture surface of the two-layer structure ceramic porous body 14 of the second example taken by a scanning electron microscope, and FIG. 32 depicts a SEM image of a portion of the surface of the inorganic porous film 12 of the two-layer structure ceramic porous body 14 of the comparative example taken by a scanning electron microscope.

As depicted in FIG. 31, even if the slurry is used that has the alumina particles 12$a$ smaller than the fine pores of the alumina porous body 10, a film can be produced by dipping the green molded body molded at the molding step P3 into the slurry, and the inorganic porous film 12 having a substantially uniform thickness is formed on the two-layer structure ceramic porous body 14 of the second example. The alumina porous body 10 has the average pore diameter of 9.3 µm and the porosity of 41% while the inorganic porous film 12 has the average pore diameter of 0.4 µm and the porosity of 40%, and the average particle diameter of the alumina particles 12$a$ making up the inorganic porous film 12 is 1.5 µm, which is sufficiently smaller than the average pore diameter of 9.3 µm of the alumina porous body 10. Since the two-layer structure ceramic porous body 14 of the second example is fired at a firing temperature set to a comparatively low temperature of 1450 degrees C., densification due to sintering is not progressed in the inorganic porous film 12 having the fine alumina particles 12$a$ with an average particle diameter of about 1.5 µm.

Figure 32:
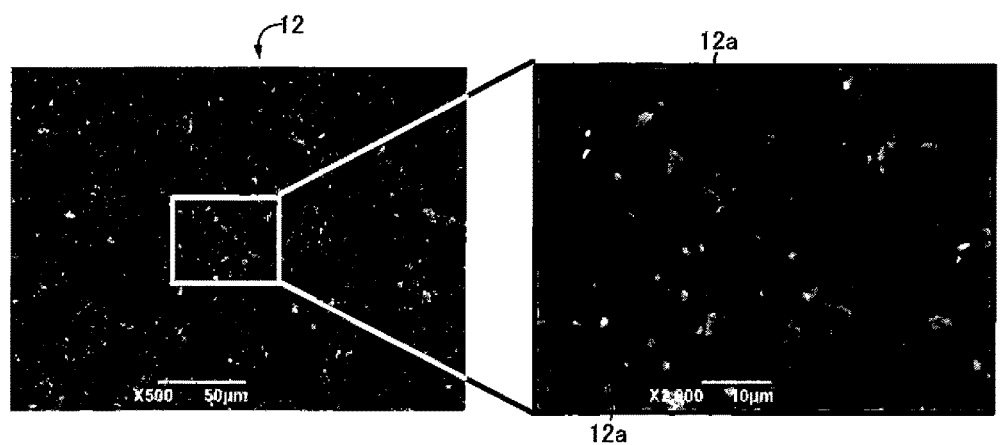
FIG. 32 is a diagram of a SEM image of a portion of a surface of the inorganic porous film taken by a scanning electron microscope in the two-layer structure ceramic porous body manufactured by dipping slurry into the once fired alumina porous body and firing the alumina porous body again.

As depicted in FIG. 32, since the slurry is used that has the alumina particles 12$a$ smaller than the fine pores of the alumina porous body 10, the slurry used for dipping the alumina porous body 10 is absorbed into the alumina porous body 10, and the inorganic porous film 12 is almost not formed on the two-layer structure ceramic porous body 14 of the comparative example and holes are formed in places.

Although the two-layer structure ceramic porous body 14 of the second example has the inorganic porous film 12 formed substantially on the alumina porous body 10 of the example product 2 in the experiment III since the addition amount of mullite added to alumina at the first mixing step P1 is set to 1.99 mol % while the addition amount of yttria added to alumina at the first mixing step P1 is set to 0.85 mol %, the addition amount of mullite or kaolinite added to alumina at the first mixing step P1 may be changed and the addition amount of yttria added to alumina at the first mixing step P1 may be changed to manufacture the two-layer structure ceramic porous body 14 of the second example having the inorganic porous film 12 formed on the alumina porous bodies 10 of the example products 1 and 3 to 8. These inorganic porous films 12 of the two-layer structure ceramic porous bodies 14 of the second example have substantially uniform thickness as depicted in FIG. 31 and, since the firing was performed at a firing temperature set to a comparatively low temperature of 1450 degrees C., densification due to sintering is not progressed in the inorganic porous films 12.

As described above, the alumina porous bodies 10 of the example products 1 to 8 are used for the two-layer structure ceramic porous body 14 with the inorganic porous film 12 formed on the alumina porous body 10. Therefore, since the alumina porous body 10 is sintered at a firing temperature set to a comparatively low temperature of 1450 degrees C., for example, if the slurry for forming the inorganic porous film 12 is applied onto the green molded body of the alumina porous body 10 molded into a predetermined shape by extrusion molding from material acquired by kneading alumina particles 16 with a molding auxiliary agent added thereto and the green molded body and the slurry are simultaneously fired, progression of densification due to sintering is suppressed in the inorganic porous film 12.

According to the method of manufacturing the two-layer structure ceramic porous body 14 of the second example with the inorganic porous film 12 formed on the alumina porous body 10, the Si compound 18, i.e., mullite or kaolinite, and the rare-earth oxide 20, i.e., yttria, are mixed with the aggregate alumina particles 16 at the first mixing step P1; the material mixed at the first mixing step P1 is molded into a pipe shape at the molding step P3; the organic binder 28 and the water 26 are mixed with the inorganic powder 12$a$ making up the inorganic porous film 12 so as to adjust the slurry at the second mixing step P6; the slurry adjusted at the second mixing step P6 is allowed to adhere in a layer form at the dipping step P7 to the surface of the pipe-shaped green molded body molded at the molding step P3; the pipe-shaped green molded body with the slurry allowed to adhere thereto in a layer form at the dipping step P7 is fired at a firing temperature of 1450 degrees C., at which the compound 22 is synthesized and melted to bind the alumina particles 16 to each other at the firing step P9; and as a result, the two-layer structure ceramic porous body 14 is manufactured that has the inorganic porous film 12 formed on the alumina porous body 10 with progression of densification preferably suppressed.

Although the examples of the present invention have been described in detail with reference to the drawings, the present invention is applied in other forms.

Although $Y_2O_3$ is added as the rare-earth oxide 20 to the coarse-particle alumina 16 at the first mixing step P1 in the first example, $Gd_2O_3$ or $La_2O_3$ may be added instead of $Y_2O_3$. The rare-earth oxide 20 may be at least one rare-earth oxide selected from $Gd_2O_3$, $La_2O_3$, and $Y_2O_3$.

In particular, predetermined amounts of mullite or kaolinite and $Y_2O_3$ are added as the Si compound 18 and the rare-earth oxide 20, respectively, to the coarse-particle alumina at the first mixing step P1 and are subsequently fired to bind $Y_2Si_2O_7$ synthesized from mullite or kaolinite and $Y_2O_3$ between the alumina particles 16, and the average radial crushing strength of the alumina porous body 10 becomes higher. However, for example, when a predetermined amount of $Gd_2O_3$ is added instead of $Y_2O_3$ to bind $Gd_xSi_yO_z$ (gadolinium silicate) between the alumina particles 16, the average radial crushing strength of the alumina porous body 10 becomes higher. Alternatively, when a predetermined amount of $La_2O_3$ is added instead of $Y_2O_3$ to bind $La_xSi_yO_z$ (lanthanum silicate) between the alumina particles 16, the average radial crushing strength of the alumina porous body 10 becomes higher. The effects same as the alumina porous bodies 10 of the example products 1 to 8 are acquired also in this way.

Although the alumina porous body 10 is fired at the firing temperature of 1450 degrees C. in the first example, the alumina porous body 10 having comparatively high average radial crushing strength can be manufactured by firing at, for example, a firing temperature equal to or less than 1450 degrees C., given that $Y_2Si_2O_7$ is bound between the alumina particles 16. In short, the firing temperature may be any temperature at which the compound $R_XSi_YO_Z$ is synthesized from the Si compound 18 and the rare-earth oxide 20 such that the coarse alumina particles 16 are bound to each other due to melting of the compound $R_XSi_YO_Z$.

Although active drying is performed by using a dryer at the first drying step P4 and the second drying step P8, the drying may be natural drying.

Although the pipe-shaped green molded body is molded at the molding step P3 by extrusion molding from the mixture kneaded with the molding auxiliary agent added thereto at the kneading step P2, a plate-shaped green molded body may be molded by press molding, roll forming, stamping molding, etc. If cast molding (casting) is used at the molding step P3, slurry may be created by adding water and, if necessary, a molding auxiliary agent such as a synthetic stabilizer, to the mixture of the alumina particles 16, the rare-earth oxide 20, and the Si compound 18 at the first mixing step P1, and the slurry may be used for the cast molding at the molding step P3.

The above description is merely an embodiment and the present invention can be implemented in variously modified and improved forms based on the knowledge of those skilled in the art.

NOMENCLATURE OF ELEMENTS

10: alumina porous body 12: inorganic porous film 12a: inorganic powder 14: two-layer structure ceramic porous body 16: alumina particles 18: Si compound 20: rare-earth oxide 22: compound P1: first mixing step P3: molding step P6: second mixing step P7: dipping step (slurry coating step) P5, P9: firing step

The invention claimed is:

1. A ceramic porous body having
an alumina porous body made up by binding aggregate alumina particles to each other,
the aggregate alumina particles being bound to each other by a crystalline compound comprising a yttrium silicate synthesized from kaolinite and $Y_2O_3$, wherein the crystalline compound is a compound of the following formula:

$R_XSi_YO_Z$ where

R is yttrium,
X is the number of atoms of R,
Y is the number of atoms of silicon, and
Z is the number of atoms of oxygen;
and
an inorganic porous film formed on an outer surface of the alumina porous body such that the ceramic porous body has a two-layer structure; wherein
the kaolinite and $Y_2O_3$ are mixed at a molar ratio of kaolinite to $Y_2O_3$ within a range of 2.3 to 6.2,
the alumina porous body and the inorganic porous film have open pores that connect to a surface of the ceramic porous body,
the pores of the inorganic porous film formed on the outer surface of the alumina porous body are smaller than the pores of the alumina porous body,
the inorganic porous film is not present in the pores of the alumina porous body, and
the inorganic porous film is fired such that inorganic powders in the inorganic porous film are chemically bonded to each other.

2. A method of manufacturing the alumina porous body of claim 1, comprising:
a first mixing step of mixing kaolinite and $Y_2O_3$ with aggregate alumina particles, wherein the kaolinite and $Y_2O_3$ are mixed at a molar ratio of kaolinite to $Y_2O_3$ in a range of 2.3 to 6.2;
a molding step of molding material mixed at the first mixing step into a molded body of a predetermined shape; and
a firing step of firing the molded body molded at the molding step at a firing temperature at which a compound is synthesized from kaolinite and $Y_2O_3$ and melted to bind the alumina particles to each other; wherein
the formed alumina porous body comprises the aggregate alumina particles bound to each other by a crystalline compound comprising a yttrium silicate synthesized from kaolinite and $Y_2O_3$ wherein the crystalline compound is a compound of the following formula:

$R_XSi_YO_Z$ where

R is yttrium,
X is the number of atoms of R,
Y is the number of atoms of silicon, and
Z is the number of atoms of oxygen;
and
an inorganic porous film formed on an outer surface of the alumina porous body such that the ceramic porous body has a two-layer structure; wherein
the alumina porous body and the inorganic porous film have open pores that connect to a surface of the ceramic porous body,
the pores of the inorganic porous film formed on the outer surface of the alumina porous body are smaller than the pores of the alumina porous body,
the inorganic porous film is not present in the pores of the alumina porous body, and
the inorganic porous the inorganic powders in the inorganic porous film are chemically bonded to each other.

3. A method of manufacturing the two-layer structure ceramic porous body with an inorganic porous film formed on an alumina porous body of claim 1, comprising:
a first mixing step of mixing kaolinite and $Y_2O_3$ with aggregate alumina particles, wherein the kaolinite and $Y_2O_3$ are mixed at a molar ratio of kaolinite to $Y_2O_3$ in a range of 2.3 to 6.2;
a molding step of molding material mixed at the first mixing step into a molded body of a predetermined shape;
a second mixing step of mixing an organic binder and water with inorganic powder making up the inorganic porous film so as to prepare slurry;
a slurry coating step of allowing the slurry prepared at the second mixing step to adhere in a layer form to a surface of the molded body molded at the molding process; and
a firing step of firing the molded body with the slurry adhered in a layer form at the slurry coating step at a firing temperature at which a compound is synthesized from kaolinite and $Y_2O_3$ and melted to bind the alumina particles to each other; wherein the formed alumina porous body comprises the aggregate alumina particles bound to each other by a crystalline compound comprising a yttrium silicate synthesized from kaolinite and $Y_2O_3$ wherein the crystalline compound is a compound of the following formula:

$R_XSi_YO_Z$ where

R is yttrium,
X is the number of atoms of R,
Y is the number of atoms of silicon, and
Z is the number of atoms of oxygen;
and
an inorganic porous film formed on an outer surface of the alumina porous body such that the ceramic porous body has a two-layer structure; wherein the alumina porous body and the inorganic porous film have open pores that connect to a surface of the ceramic porous body, the pores of the inorganic porous film formed on the outer surface of the alumina porous body are smaller than the pores of the alumina porous body, the inorganic porous film is not present in the pores of the alumina porous body, and the inorganic porous the inorganic powders in the inorganic porous film are chemically bonded to each other.

4. The ceramic porous body of claim 1, wherein the inorganic porous film is made from a powder of a material selected from the group consisting of alumina, silica, and zeolite.

5. A ceramic porous body having an alumina porous body made up by binding aggregate alumina particles to each other, the aggregate alumina particles being bound to each other by a crystalline compound comprising a yttrium silicate synthesized from kaolinite and $Y_2O_3$, wherein the crystalline compound is a compound of the following formula:

$R_XSi_YO_Z$ where

R is yttrium,
X is the number of atoms of R,
Y is the number of atoms of silicon, and
Z is the number of atoms of oxygen;
and
an inorganic porous film formed on an outer surface of the alumina porous body such that the ceramic porous body is a two-layer structure ceramic porous body, wherein the kaolinite and $Y_2O_3$ are mixed at a molar ratio of kaolinite to $Y_2O_3$ within a range of 2.3 to 6.2, the alumina porous body and the inorganic porous film have open pores that connect to a surface of the ceramic porous body, the inorganic porous film is formed from a slurry containing an inorganic powder having a particle diameter smaller than the pores of the alumina porous body, where the slurry for forming the inorganic porous film is applied onto a green molded body of the alumina porous body, and the green molded body and the slurry are simultaneously fired at a firing temperature at which a compound is synthesized from kaolinite and $Y_2O_3$ and melted to bind the alumina particles to each other, the inorganic porous film is not present in the pores of the alumina porous body, and the inorganic porous film is fired such that inorganic powders in the inorganic porous film are chemically bonded to each other.

6. The ceramic porous body of claim 5, wherein a thickness of the inorganic porous film is 10 to 300 μm.

7. The ceramic porous body of claim 5, wherein the pores of the inorganic porous film formed on the outer surface of the alumina porous body are smaller than the pores of the alumina porous body.

8. The ceramic porous body of claim 5, wherein the green molded body of the alumina porous body comprises alumina particles, and a particle diameter of the inorganic powder is smaller than a particle diameter of the alumina particles.

9. The ceramic porous body of claim 5, wherein the firing temperature is equal to or less than 1450° C.

10. The ceramic porous body of claim 5, wherein the inorganic powder is a powder made of a material selected from the group consisting of alumina, silica, and zeolite.

11. The ceramic porous body of claim 1, wherein a thickness of the inorganic porous film that is on the outer surface of the alumina porous body is 10 to 300 μm.

12. The ceramic porous body of claim 1, wherein the alumina porous body has a hollow cylindrical shape.

13. The ceramic porous body of claim 5, wherein the alumina porous body has a hollow cylindrical shape.

14. The ceramic porous body of claim 1, wherein a firing temperature at which the inorganic porous film is fired is equal to or less than 1450° C.

\* \* \* \* \*